US010622643B2

(12) United States Patent
Tarutani

(10) Patent No.: US 10,622,643 B2
(45) Date of Patent: Apr. 14, 2020

(54) CARBON SEPARATOR FOR SOLID POLYMER FUEL CELL, SOLID POLYMER FUEL CELL, AND SOLID POLYMER FUEL CELL STACK

(71) Applicant: NIPPON STEEL & SUMITOMO METAL CORPORATION, Tokyo (JP)

(72) Inventor: Yoshio Tarutani, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 15/761,502

(22) PCT Filed: Sep. 20, 2016

(86) PCT No.: PCT/JP2016/077749
§ 371 (c)(1),
(2) Date: Mar. 20, 2018

(87) PCT Pub. No.: WO2017/051810
PCT Pub. Date: Mar. 30, 2017

(65) Prior Publication Data
US 2018/0269496 A1 Sep. 20, 2018

(30) Foreign Application Priority Data
Sep. 25, 2015 (JP) ................. 2015-188606

(51) Int. Cl.
C22C 38/00 (2006.01)
H01M 8/0228 (2016.01)
(Continued)

(52) U.S. Cl.
CPC .......... H01M 8/0228 (2013.01); C21D 6/004 (2013.01); C21D 6/005 (2013.01); C21D 6/008 (2013.01);
(Continued)

(58) Field of Classification Search
CPC .......... C22C 38/54; C22C 38/32; C22C 38/46; C22C 38/44; C22C 38/22; H01M 8/0213; H01M 8/021
See application file for complete search history.

(56) References Cited

U.S. PATENT DOCUMENTS

| 2011/0250522 A1* | 10/2011 | Kaminaka | ............... C22C 38/40 429/479 |
| 2013/0017116 A1* | 1/2013 | Hatano | ............... C21D 6/002 420/36 |
| 2015/0090586 A1* | 4/2015 | Kozak | ............... C25B 11/04 204/286.1 |

FOREIGN PATENT DOCUMENTS

| JP | 2000-090941 | 3/2000 |
| JP | 2000-182630 | 6/2000 |

(Continued)

Primary Examiner — Chanceity N Robinson
Assistant Examiner — Monique M Wills
(74) Attorney, Agent, or Firm — Clark & Brody

(57) ABSTRACT

A carbon separator for a solid polymer fuel cell is provided that includes a core material made of steel, and a carbon layer. The chemical composition of the steel is, by mass %, C: more than 0.02% to 0.12% or less, Si: 0.05 to 1.5%, Al: 0.001 to 1.0%, Mn: 0.01 to 1.0%, P: 0.045% or less, S: 0.01% or less, N: 0.06% or less, V: 0.5% or less, Cr: more than 13.0% to less than 25.0%, Mo: 0 to 2.5%, Ni: 0 to 0.8%, Cu: 0 to 0.8%, REM: 0 to 0.1%, B: 0 to 1.0%, Sn: 0 to 2.5%, In: 0 to 0.1%, and the balance: Fe and impurities. The steel has therein precipitates including $M_{23}C_6$ type Cr carbides that are finely precipitated and dispersed. A part of the precipitates protrude from the steel surface.

12 Claims, 5 Drawing Sheets

(51) Int. Cl.
| | |
|---|---|
| C22C 38/54 | (2006.01) |
| C22C 38/32 | (2006.01) |
| C21D 6/00 | (2006.01) |
| C21D 6/02 | (2006.01) |
| C21D 8/00 | (2006.01) |
| C21D 8/02 | (2006.01) |
| C22C 38/02 | (2006.01) |
| C22C 38/04 | (2006.01) |
| C22C 38/06 | (2006.01) |
| C22C 38/20 | (2006.01) |
| C22C 38/22 | (2006.01) |
| C22C 38/24 | (2006.01) |
| C22C 38/42 | (2006.01) |
| C22C 38/44 | (2006.01) |
| C22C 38/46 | (2006.01) |
| H01M 8/021 | (2016.01) |
| H01M 8/0213 | (2016.01) |
| H01M 8/241 | (2016.01) |
| H01M 8/1018 | (2016.01) |

(52) U.S. Cl.
CPC ............. *C21D 6/02* (2013.01); *C21D 8/005* (2013.01); *C21D 8/021* (2013.01); *C21D 8/0226* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/32* (2013.01); *C22C 38/42* (2013.01); *C22C 38/44* (2013.01); *C22C 38/46* (2013.01); *C22C 38/54* (2013.01); *H01M 8/021* (2013.01); *H01M 8/0213* (2013.01); *H01M 8/241* (2013.01); *H01M 2008/1095* (2013.01); *H01M 2300/0082* (2013.01)

(56) References Cited

FOREIGN PATENT DOCUMENTS

| | | |
|---|---|---|
| JP | 2000-239806 | 9/2000 |
| JP | 2000-294255 | 10/2000 |
| JP | 2000-294256 | 10/2000 |
| JP | 2000-299117 | 10/2000 |
| JP | 2000-303151 | 10/2000 |
| JP | 2001-214286 | 8/2001 |
| JP | 2001-216976 | 8/2001 |
| JP | 2001-325967 | 11/2001 |
| JP | 2002-151111 | 5/2002 |
| JP | 2003-193206 | 7/2003 |
| JP | 4028890 | 12/2007 |
| WO | 2009/157557 | 12/2009 |
| WO | 2010/041694 | 4/2010 |

* cited by examiner

CARBON SEPARATOR FOR SOLID POLYMER FUEL CELL, SOLID POLYMER FUEL CELL, AND SOLID POLYMER FUEL CELL STACK

TECHNICAL FIELD

The present invention relates to a carbon separator for a solid polymer fuel cell, a solid polymer fuel cell in which the carbon separator is applied, and a solid polymer fuel cell stack.

BACKGROUND ART

Fuel cells are cells that utilize hydrogen and oxygen to generate direct-current power, and are broadly divided into a solid electrolyte type, a molten carbonate type, a phosphoric acid type and a solid polymer type. The respective types derive from the constituent material of an electrolyte portion that constitutes the basic portion of the fuel cell.

Currently, fuel cells that have reached the commercial stage include phosphoric acid type fuel cells that operate around 200° C., and molten carbonate type fuel cells that operate around 650° C. With the progress of technological development in recent years, solid polymer type fuel cells that operate around room temperature and solid electrolyte type fuel cells that operate at 700° C. or more are attracting attention as small-size power sources for mounting in automobiles or for household use.

FIG. 1 is a multiple-view explanatory drawing that illustrates the structure of a solid polymer fuel cell, in which FIG. 1(a) is an exploded view of a fuel cell (unit cell), and FIG. 1(b) is a perspective view of the entire fuel cell stack.

As illustrated in FIG. 1(a) and FIG. 1(b), a fuel cell stack 1 is an assembly of unit cells. As shown in FIG. 1(a), each unit cell has a structure in which a fuel electrode layer (anode) 3 is laminated on one surface of a solid polymer membrane 2, an oxide electrode layer (cathode) 4 is laminated on the other surface, and separators 5a and 5b are overlaid on the two surfaces.

A fluorine ion exchange resin film that has hydrogen ion (proton) exchange groups is a typical example of the solid polymer membrane 2.

The fuel electrode layer 3 and the oxide electrode layer 4 respectively include a diffusion layer, and a catalyst layer provided on a surface on the solid polymer membrane 2 side of the diffusion layer. The diffusion layer is composed of carbon paper or carbon cloth constituted by carbon fiber. The catalyst layer is composed of a particulate platinum catalyst, graphite powder, and a fluorocarbon resin having hydrogen ion (proton) exchange groups. The catalyst layers of the fuel electrode layer 3 and the oxide electrode layer 4 come in contact with fuel gas or oxidizing gas that permeates through the diffusion layer, respectively.

A fuel gas (hydrogen or a hydrogen-containing gas) A is fed through channels 6a provided in the separator 5a to supply hydrogen to the fuel electrode layer 3. An oxidizing gas B such as air is fed through channels 6b provided in the separator 5b to supply oxygen. The supply of these gases causes an electrochemical reaction, to thereby generate direct-current power.

The functions required of a solid polymer fuel cell separator are: (1) a function as a "channel" for supplying a fuel gas with in-plane uniformity on the fuel electrode side; (2) a function as a "channel" for efficiently discharging water produced on the cathode side from the fuel cell system together with carrier gases such as air and oxygen after the reaction; (3) a function as an electrical "connector" between unit cells that maintains low electrical contact resistance and favorable electric conductivity as an electrode over a long time period; and (4) a function as an "isolating wall" between adjacent cells for isolating an anode chamber of one cell from a cathode chamber of an adjacent cell.

Research of various kinds has been conducted up to now concerning base materials for separators that exert the foregoing functions. The materials used for separators are broadly classified into metal materials and carbon-based materials.

With regard to carbon-based materials, the application thereof to a separator composed of a carbon plate material has been earnestly studied at the laboratory level. However, there is a problem in that a carbon plate material easily cracks, and furthermore there is a problem in that machining costs for making the surface even and machining costs for gas channel formation are extremely high. Each of these is a significant problem, and makes the commercialization of fuel cells itself difficult.

There is a movement towards attempting to apply a carbon composite material that adopts a thermoplastic resin or a thermosetting resin as a binder, instead of a carbon plate material. Powders of flake graphite, lumpy graphite, acetylene black, carbon black, Ketjen black, expanded graphite and artificial graphite and the like are used as electroconductive carbonaceous powders, and powder having a mean particle diameter in a range of around 10 nm to 100 μm is used. The development of resins for use as a binder is being actively conducted, and recent improvements in performance are noticeable and there are also remarkable improvements in productivity and costs.

For example, Patent Document 1 discloses a separator for a polymer electrolyte fuel cell that is interposed between gas diffusion electrodes of the fuel cell, and that has, on one side or on both sides of a carbon composite material, a groove for supplying an oxidizing agent gas or a fuel gas, the carbon composite material consisting of an expanded graphite powder and a thermoplastic resin or a thermosetting resin or a fired product thereof, with the expanded graphite powder being dispersed in the thermoplastic resin, the thermosetting resin or the fired product thereof and the expanded graphite powder having a mean particle diameter of 5-12 μm, and at least 80% of the total particles of the expanded graphite powder having particle diameters in a range of 0.1-20 μm.

In Patent Document 1, the reason for defining the mean particle diameter is described as follows. In a case where the mean particle diameter of the expanded graphite is less than 5 μm, it is difficult for the thermoplastic resin or thermosetting resin to permeate between particles of the expanded graphite. Therefore, there is a significant loss in the gas barrier property. Conversely, in a case where the mean particle diameter is greater than 12 μm, it is difficult for the thermoplastic resin or thermosetting resin to fill-in gaps between particles of the expanded graphite. As a result, not only is there a significant loss in the gas barrier property, but the packing density falls and the electrical connection is insufficient, and consequently the electrical conductivity decreases.

Patent Document 2 discloses a fuel cell separator that is formed of a base material which is composed of at least a binder, a powdered carbon filler having a mean particle diameter of 10 nm to 100 μm, and short fibers having a mean fiber length of 0.07 to 3.0 mm, and which is obtained when the quantity ratio between these components is 200 to 800 parts by weight of the powdered carbon filler and 68 to 300 parts by weight of the short fibers with respect to 100 parts by weight of the binder, and in which a bending deflection in accordance with JIS K 6911 is from 0.5 to 1.0 mm.

Patent Document 3 discloses that, to make a separator substrate for a fuel cell that is excellent in impact resistance and toughness, a rubber-modified phenol resin is used as a binder in a separator substrate for a fuel cell that is formed by molding a mixture that includes at least electrically conductive powder and a binder.

The proportion of the rubber-modified phenol resin is given as 5 to 50 parts by weight with respect to 100 parts by weight of the electrically conductive powder. The bending modulus is given as 40 to 1 GPa, and the deflection at the time of rupturing when performing a bending test is given as 0.1 to 3 mm. It is stated that the mean particle diameter of the electrically conductive powder is 10 nm to 100 µm, preferably, 3 µm to 80 µm, and that formability can be improved when the mean particle diameter is 10 nm or more, and that the electrical conductivity can be improved when the mean particle diameter is 100 µm or less.

The "rubber-modified phenol resin" can be obtained by reacting an unvulcanized rubber with a phenol resin. As examples of the unvulcanized rubber, there can be mentioned one kind or a mixture of two or more kinds selected from the group consisting of fluorocarbon rubber, silicone rubber, butyl rubber, chloroprene rubber, nitrile rubber, nitrile-chloroprene rubber, chlorinated butyl rubber, chlorinated polyethylene, epichlorohydrin rubber, epichlorohydrin-ethylene oxide rubber, epichlorohydrin-ethylene oxide-acrylic glycidyl ether terpolymer, urethane rubber, acrylic rubber, ethylene-propylene rubber, styrene rubber, butadiene rubber and natural rubber.

Patent Document 4 discloses a fuel cell separator that is formed by molding a composition for a fuel cell separator that is composed of graphite, an epoxy resin, a polycarbodiimide resin as a curing agent, a curing accelerator and a mold release agent, in which the mean particle diameter of the graphite is 50 to 500 µm, and 10 parts by mass or less of the epoxy resin, 9 parts by mass or less of the polycarbodiimide resin, 0.3 parts by mass or less of the curing accelerator and 0.5 to 3 parts by mass of the mold release agent are added with respect to 100 parts by mass of graphite.

Patent Document 5 discloses a separator for a fuel cell that includes an electrically conductive core portion formed of a metal material or a metal composite material, an electrically conductive adhesive layer that covers the electrically conductive core portion, and an electrically conductive skin portion formed on the electrically conductive adhesive layer, in which the electrically conductive core portion and the electrically conductive skin portion are bonded together by the electrically conductive adhesive layer.

The electrically conductive adhesive layer is formed of a carbon-containing conductive adhesive that adopts two or more kinds of carbon powder as an electrically conductive filler and adopts a resin as a binder and contains 10 to 67 parts by weight of the resin with respect to 100 parts by weight of the electrically conductive filler. The electrically conductive skin portion is formed of a carbon-containing composite material that adopts a carbon powder as an electrically conductive filler and adopts a resin as a binder and contains 3 to 20 parts by weight of the resin with respect to 100 parts by weight of the electrically conductive filler.

Titanium, aluminum, stainless steel or the like, specifically, for example, an aluminum plate or a stainless steel plate, or a metal composite material obtained by coating a noble metal or a carbon material of the aforementioned metal materials are exemplified as the metal material constituting the electrically conductive core portion, and it is stated that, in order to enhance the adhesiveness with respect to the electrically conductive skin portion, it is also favorable to perform a surface treatment by a mechanical polishing method such as a blasting treatment, a discharge treatment, lapping or polishing.

Patent Document 6 discloses a method for manufacturing a fuel cell separator according to which a composition for a fuel cell separator mainly containing a conductive material, a binder, and an additive is mixed, granulated and dried, and thereafter a granulated substance obtained by the granulating is packed in a die and subjected to hot-press molding, in which the mean particle diameter of the aforementioned granulated substance is 60 to 160 µm and the granulated substance has the particle size distribution described hereunder, and the residual volatile matter content of the granulated substance is 4% by mass or less.

Particle Diameter Percentage

5 µm or more and less than 100 µm: 10 to 80%
100 µm or more and less than 300 µm: 10 to 40%
300 µm or more and less than 500 µm: balance However, high-temperature durability and hydrolytic durability still remain as problems with respect to carbon composite materials, and the problem of deterioration over time in an organic resin for binding that occurs during application to a fuel cell is a significant issue. Further, problems such as responding to increasingly stringent demands for dimensional accuracy and wall thinning, carbon corrosion that progresses under the influence of cell operation conditions, and unexpected cracking problems that arise when a fuel cell is assembled and during use thereof remain as issues to be solved in the future.

On the other hand, as a metal material, numerous studies have been made regarding the use of stainless steel for a separator. In addition, in order to solve the problems associated with carbon-based materials, the development of a carbon-based separator that includes a core material (core) composed of a metal material such as stainless steel and that has a carbon layer having electrical conductivity which is formed on the surface of the core material is also progressing.

For example, Patent Document 7 discloses stainless steel suitable as a separator of a solid-oxide fuel cell. Further, Patent Documents 8 and 9 disclose a solid polymer fuel cell that includes a separator made from ferritic stainless steel.

Patent Document 10 discloses ferritic stainless steel for a separator of a solid polymer fuel cell, and a solid polymer fuel cell using the same in which the ferritic stainless steel contains 0.01 to 0.15 mass % of C and in which Cr carbides precipitated.

Patent Document 11 discloses stainless steel for a separator of a solid polymer fuel cell in which one or more kinds among $M_{23}C_6$ type, $M_4C$ type, $M_2C$ type and MC type carbide-based metal inclusions and $M_2B$ type boride-based metal inclusions which have electrical conductivity are dispersed and exposed on the stainless steel surface, and states a ferritic stainless steel that contains, by mass %, C: 0.15% or less, Si: 0.01 to 1.5%, Mn: 0.01 to 1.5%, P: 0.04% or less, S: 0.01% or less, Cr: 15 to 36%, Al: 0.001 to 6% and N: 0.035% or less, in which the respective contents of Cr, Mo and B satisfy the expression $17\% \leq Cr+3\times Mo-2.5\times B$, with the balance being Fe and unavoidable impurities.

Patent Document 12 describes a method for producing stainless steel material for a separator of a solid polymer fuel cell in which the surface of the stainless steel material is etched using an acidic aqueous solution to expose one or more kinds among $M_{23}C_6$ type, Mat type, $M_2C$ type and MC type carbide-based metal inclusions and $M_2B$ type boride-based metal inclusions having electrical conductivity on the surface, and also discloses a ferritic stainless steel material that contains, by mass %, C: 0.15% or less, Si: 0.01 to 1.5%, Mn: 0.01 to 1.5%, P: 0.04% or less, S: 0.01% or less, Cr: 15 to 36%, Al: 0.001 to 1%, B: 0 to 3.5%, N: 0.035% or less, Ni: 0 to 5%, Mo: 0 to 7%, Cu: 0 to 1%, Ti: 0 to 25×(C %+N %), and Nb: 0 to 25×(C %+N %), in which the respective contents of Cr, Mo and B satisfy the expression 17%≤Cr+3×Mo−2.5×B, with the balance being Fe and impurities.

Further, Patent Document 13 describes a solid polymer fuel cell in which an $M_2B$ type boride-based metal compound is exposed on the surface, and when an anode area and a cathode area are taken as 1, respectively, a proportion of the area of the anode which directly contacts a separator and a proportion of the area of the cathode which directly contacts a separator are each within a range of 0.3 to 0.7, and also discloses stainless steel in which one or more kinds among $M_{23}C_6$ type, $M_4C$ type, $M_2C$ type and MC type carbide-based metal inclusions and $M_2B$ type boride-based metal inclusions which have electrical conductivity are exposed on the stainless steel surface.

In addition, Patent Document 13 discloses, with respect to the stainless steel constituting the separator, a ferritic stainless steel material is disclosed that consists of, by mass %, C: 0.15% or less, Si: 0.01 to 1.5%, Mn: 0.01 to 1.5%, P: 0.04% or less, S: 0.01% or less, Cr: 15 to 36%, Al: 0.2% or less, B: 3.5% or less (however, excluding 0%), N: 0.035% or less, Ni: 5% or less, Mo: 7% or less, W: 4% or less, V: 0.2% or less, Cu: 1% or less, Ti: 25×(C %+N %) or less and Nb: 25×(C %+N %) or less, in which the respective contents of Cr, Mo and B satisfy the expression 17%≤Cr+3×Mo−2.5×B.

LIST OF PRIOR ART DOCUMENTS

Patent Document

Patent Document 1: JP4028890B
Patent Document 2: JP2000-182630A
Patent Document 3: JP2000-90941A
Patent Document 4: JP2001-216976A
Patent Document 5: JP2000-299117A
Patent Document 6: JP2001-325967A
Patent Document 7: JP2000-239806A
Patent Document 8: JP2000-294255A
Patent Document 9: JP2000-294256A
Patent Document 10: JP2000-303151A
Patent Document 11: JP2003-193206A
Patent Document 12: JP2001-214286A
Patent Document 13: JP2002-151111A

SUMMARY OF INVENTION

Technical Problem

An object of the present invention is to provide a carbon separator that has a core material made from steel, and a carbon layer, and suitable for a solid polymer fuel cell, and a solid polymer fuel cell to which the carbon separator is applied, and a solid polymer fuel cell stack. Note that, a "separator" referred to herein may also be referred to as a "bipolar plate".

Solution to Problem

The present invention was conceived to solve the issues described above, and the gist of the present invention is a carbon separator for a solid polymer fuel cell, a solid polymer fuel cell and a solid polymer fuel cell stack which are described hereunder.

(1) A carbon separator for a solid polymer fuel cell, the carbon separator including a core material made of steel and a carbon layer, the steel having a chemical composition consisting of, by mass %,
C: more than 0.02% to not more than 0.12%,
Si: 0.05 to 1.5%,
Al: 0.001 to 1.0%,
Mn: 0.01 to 1.0%,
P: 0.045% or less,
S: 0.01% or less,
N: 0.06% or less,
V: 0.5% or less,
Cr: more than 13.0% to less than 25.0%,
Mo: 0 to 2.5%,
Ni: 0 to 0.8%,
Cu: 0 to 0.8%,
REM: 0 to 0.1%,
B: 0 to 1.0%,
Sn: 0 to 2.5%,
In: 0 to 0.1%, and
the balance: Fe and impurities,
the steel having therein precipitates including $M_{23}C_6$ type Cr carbides that are finely precipitated and dispersed,
wherein a part of the precipitates protrude from the steel surface.

(2) The carbon separator according to (1) above, wherein the chemical composition contains, by mass %:
In: 0.001 to 0.1%.

(3) The carbon separator according to (1) or (2) above, wherein the chemical composition contains, by mass %:
B: more than 0.0003% to not more than 1.0%.

(4) The carbon separator according to (3) above, wherein: the precipitates further include $M_2B$ type borides.

(5) The carbon separator according to (3) above, wherein: the precipitates further include composite precipitates in which $M_{23}C_6$ type Cr carbides are precipitated on surfaces of $M_2B$ type borides as precipitation nuclei.

(6) A solid polymer fuel cell including a carbon separator according to any one of (1) to (5) above.

(7) A solid polymer fuel cell stack including a solid polymer fuel cell according to (6) above.

Advantageous Effects of Invention

According to the present invention it is possible to provide a carbon separator suitable for a solid polymer fuel cell that is to be used as a power source for mounting in an automobile or for household use.

BRIEF DESCRIPTION OF DRAWINGS

FIG. 1 is a multiple-view explanatory drawing illustrating the structure of a solid polymer fuel cell, in which FIG. 1(a) is an exploded view of a fuel cell (unit cell), and FIG. 1(b) is a perspective view of an entire fuel cell stack.

DESCRIPTION OF EMBODIMENTS

Figure 1:
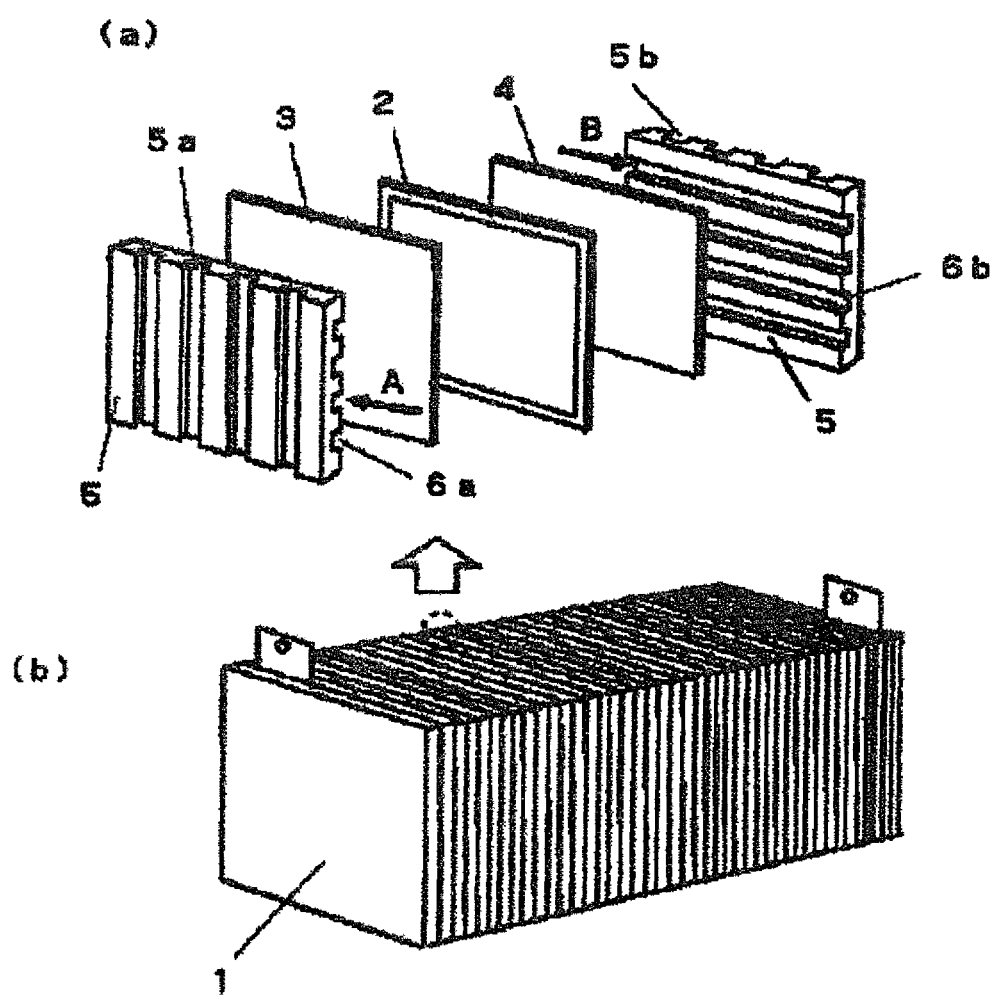

The present inventors devoted their studies over many years to the development of a stainless steel material in which, even when it is used for a long time period as a separator of a solid polymer fuel cell, there is little metal elution from the surface of a separator, progression of metal ion contamination of an MEA ("membrane electrode assembly") that includes a diffusion layer, a polymer membrane and a catalyst layer can be suppressed, and which is not liable to cause a decline in the performance of a catalyst or a polymer membrane. As a result, the present inventors have obtained the findings described hereunder.

(a) Reducing the production cost of solid polymer fuel cells is an urgent issue that ranks alongside the issue of investment in the socioeconomic infrastructure for supplying hydrogen. In particular, reducing the cost of separators that account for a large portion of the cost of a fuel cell is a major issue.

(b) The following materials may be mentioned as starting material for a separator. As material for use with a carbon separator, a carbon-based material in which electrically conductive carbon powder is fixed with a thermoplastic resin or a thermosetting resin. As material for use with a metal separator, a metal raw material such as a stainless steel sheet or a titanium sheet is used. Further, as material for use with a carbon separator, a composite material that further includes a core material composed of a metal raw material is sometimes used. The composite material includes the core material that is composed of a metal raw material, and a layer (carbon layer) that is composed of a carbon-based material. The composite material may also have an adhesive layer between the core material and the carbon layer. The adhesive layer has electrical conductivity, and for example is composed of an electrically conductive carbon powder and a resin.

(c) The performance required as the aforementioned composite material for a carbon separator is as follows.

(i) The core material must not cause corrosion that is accompanied by metal ion elution during application to a solid polymer fuel cell. If metal ion elution occurs, it causes deterioration of the solid polymer membrane and a drop in the MEA performance due to catalyst poisoning. Accordingly, it is necessary for the core material to have corrosion resistance even when it is exposed to a hot-water environment inside a fuel cell that is an extremely special and severe corrosive environment. The core material is exposed to the internal environment of the cell through microscopic defect portions between the carbon layer and the adhesive layer during operation of the fuel cell. In addition, the core material is exposed to corrosion from an exposed end face, and corrosion caused by eluted components from swollen resin. Consequently, it is necessary for the core material to have corrosion resistance that is sufficient for even exposure to a hot-water environment within a fuel cell.

(ii) The adhesive strength between the core material and the adhesive layer that is composed of electrically conductive carbon powder and resin and that contacts the core material must be high, and the adhesive layer must not peel off from the core material during application to a solid polymer fuel cell. It is required that stable and low electrical surface contact resistance (hereunder, also referred to simply as "contact resistance") can be maintained. The lower the contact resistance is, the more preferable it is.

(iii) It is required that, when the core material is processed into a prescribed shape, the durable life of the molding die is long, there is little wear of the cutting edge of a punching die, and mass production is not inhibited.

(iv) It must be possible to provide the composite material in a coiled state as a raw material. The composite material must not undergo compression buckling due to fastening at the time of constructing the fuel cell stack.

(v) The composite material must not be corroded by gas that arises from the adhesive layer and the carbon layer that is composed of an electroconductive carbonaceous powder and a resin binder when firing is performed during the process of producing the carbon separator.

(vi) The composite material must be excellent in mass production characteristics, the unit cost of the raw material must be low, and the composite material must be recyclable as a resource.

Among the above requirements, improving corrosion resistance and maintaining low contact resistance are particularly important challenges. The inventors obtained the following findings as measures for achieving improvements with respect to these performance requirements.

(d) By using steel in which Cr carbides are precipitated in the steel as the metal raw material to be used as the core material, electrical contact resistance with the adhesive layer can be lowered. In particular, it is desirable that $M_{23}C_6$ type Cr carbides disperse finely in the grains and protrude from the surface of the base material. By controlling the production conditions, it is possible to cause Cr carbides to finely disperse in the grains.

(e) When the precipitates also include borides, the electrical contact resistance with the adhesive layer can be further decreased. In particular, it is desirable that $M_2B$ type borides that precipitate by a eutectic reaction when the raw material solidifies finely disperse in the grains and protrude from the surface of the base material. By controlling the production conditions, it is possible to also cause borides to finely disperse in the grains.

(f) In a case where, as the precipitates, the core material also includes precipitates that have $M_2B$ type borides as the precipitation nuclei and have $M_{23}C_6$ type Cr carbides precipitated on the surface of the precipitation nuclei, the precipitates function as composite large-sized electrically conductive metal precipitates, and can noticeably lower the electrical contact resistance with the adhesive layer.

(g) By adjusting the surface roughness of the steel, it is possible to raise the mechanical adhesive strength with the adhesive layer and to lower the electrical contact resistance with the adhesive layer.

(h) When Sn and/or In are contained in the steel, after etching by performing appropriate pickling or during operation, the Sn and/or In metal, or hydroxides or oxides thereof concentrate at the core material surface. As a result, the electrical conductivity of the core material surface is improved and the electrical contact resistance with the adhesive layer decreases. That is, the performance as a core material that is exposed to the extremely special environment inside a fuel cell is stably improved over an extended period.

The present invention has been made based on the above findings. The respective requirements of the present invention are described in detail hereunder.

The solid polymer fuel cell carbon separator according to the present invention includes therein a core material composed of steel that is excellent in corrosion resistance and contact resistance characteristics.

1. Chemical Composition of Steel

The reasons for limiting each element are as follows. Note that, the symbol "%" with respect to content in the following description represents "mass percent".

C: more than 0.02% to not more than 0.12%

C is a required element for causing $M_{23}C_6$ type Cr carbides to precipitate and thereby improve the electrical contact resistance characteristics (hereunder, referred to simply as "contact resistance characteristics") at the steel surface. When the C content is 0.02% or less, an adequate amount of precipitated $M_{23}C_6$ type Cr carbides cannot be secured, and the desired contact resistance characteristics are not obtained. On the other hand, if an excessive amount of C is contained, the producibility noticeably deteriorates. Therefore, the C content is made more than 0.02% and not more than 0.12%. To obtain the aforementioned effect, the C content is preferably 0.04% or more, and more preferably is 0.05% or more.

Si: 0.05 to 1.5%

Si is an element that is added for deoxidation at the molten steel stage. If the Si content is less than 0.05%, control of the steel is difficult, and even if it is possible, the mass production characteristics decrease and the production cost increases. In contrast, if the Si content is more than 1.5%, not only is the effect as a deoxidizing element saturated, but the workability as a raw material also decreases. Therefore, the Si content is made 0.05 to 1.5%. The Si content is preferably 0.1% or more. The Si content is preferably 1.4% or less, and more preferably is 1.3% or less.

Si has an effect that promotes surface concentration of Sn and In. In particular, when the Si content is 0.25% or more, this effect is noticeably exerted. Although the reason is not clear, it is estimated that it is because Si has an action that lowers the natural immersion potential of ferritic stainless steel in a ferric chloride solution of a sulfuric acid aqueous solution that is used to adjust the surface roughness of the steel used in the present invention, and as a result of the surface potential being lowered, the surface concentration of Sn and In as metal or oxides is promoted.

Al: 0.001 to 1.0%

Similarly to Si, Al is also an element that is added for deoxidation at the molten steel stage. If the Al content is less than 0.001%, the effect as a deoxidizing element is not stable. In contrast, if the Al content is more than 1.0%, not only is the effect as a deoxidizing element saturated, but the deoxidation capacity in the molten steel is, on the contrary, reduced. Therefore, the Al content is made 0.001 to 1.0%. The Al content is preferably 0.003% or more. The Al content is preferably 0.2% or less, and more preferably is 0.15% or less. Al also has an effect that promotes the surface concentration of Sn and In.

Mn: 0.01 to 1.0%

Mn has an action that fixes S in the steel as an Mn sulfide, and also has an effect of improving hot workability. If the Mn content is less than 0.01%, the aforementioned effect is not obtained. If the Mn content is more than 1.0%, the aforementioned effect is saturated. Therefore, the Mn content is made 0.01 to 1.0%. The Mn content is preferably 0.2% or more, and more preferably is 0.3% or more.

P: 0.045% or Less

Along with S, P is a harmful impurity element. If the P content is more than 0.045%, producibility decreases. Therefore, the P content is made 0.045% or less. The P content is preferably 0.035% or less, and more preferably is 0.030% or less.

S: 0.01% or Less

S is an extremely harmful impurity element with respect to corrosion resistance. Therefore, the S content is made 0.01% or less. Depending upon the coexisting elements in the steel and the S content in the steel, S is almost entirely precipitated in the steel as sulfides of Mn, Cr, Fe or Ti or complex sulfides, or as complexes of oxides or nitrides of Mn, Cr, Fe or Ti and the aforementioned sulfides. Further, S may sometimes form a sulfide with a REM (rare earth metal) that is added as necessary.

In the environment of a separator of a solid polymer fuel cell, the sulfide-based non-metallic precipitates of any of these compositions act as the starting point for corrosion, although there are differences between the compositions with respect to the extent of corrosion, and such precipitates have an adverse effect on maintaining a passivation film and suppressing the elution of metal ions. The S content in usual mass-produced steel is from more than 0.005% to around 0.008%, however in order to suppress the aforementioned harmful effects of S, the S content is preferably 0.003% or less, and more preferably is 0.002% or less, and further preferably is less than 0.001%. The lower the S content is, the more preferable it is. Making the S content less than 0.001% in mass production on an industrial scale can be achieved with only a slight increase in production costs with present-day refining technology.

N: 0.06% or Less

N is an austenite phase-stabilizing element, and is utilized to control the micro-structure of the steel of the present invention in a state in which the steel has been heated to a high temperature, and is used for regulating the grain size in the final product. However, if the N content is more than 0.06%, the producibility decreases and the workability as raw material declines. Therefore, the N content is made 0.06% or less. The N content is preferably made 0.05% or less, and more preferably is 0.04% or less.

V: 0.5% or Less

Although it is not necessary to intentionally add V to the chemical composition, V is contained as an impurity in a Cr source that is used as a melting raw material that is used at the time of mass production. The V content is made 0.5% or less. The V content is preferably 0.40% or less, and more preferably is 0.30% or less.

Cr: More than 13.0% to Less than 25.0%

Cr is an alloying element that has an action of enhancing the corrosion resistance of the base material. Further, with respect to the steel used in the present invention, it is taken as a premise that $M_{23}C_6$ type Cr carbides are caused to precipitate and disperse therein to secure the desired electrical contact resistance characteristics. Therefore, it is necessary for a predetermined amount or more of Cr to be contained.

Further, the steel is coated with a carbon layer composed of electroconductive carbonaceous powder and a resin binder, and an adhesive layer that improves the adherence between the carbon layer and the core material. During operation of the solid polymer fuel cell, the carbon layer and the adhesive layer are exposed to hot water having a temperature in a range of around 60 to 100° C. that is generated by cell reaction, and swelling of a resin portion is unavoidable.

Therefore, in the present invention, based on the premise of usage in the aforementioned environment, it is necessary to design the corrosion resistance of the steel. In other words, it is necessary to secure corrosion resistance with respect to substances that are eluted from swollen resin accompanying deterioration of the resin. Further, in industrial products, it is also necessary to secure corrosion resistance with respect to corrosion from microscopic defect portions that unavoidably arise in the carbon layer and adhesive layer.

If the Cr content is 13.0% or less, not only will the precipitated amount of $M_{23}C_6$ type Cr carbides be insufficient, but it will also be difficult to maintain corrosion resistance even if the amounts of elements other than Cr are adjusted. On the other hand, it is not necessary to make the Cr content 25.0% or more to secure corrosion resistance, and doing so only causes an increase in costs. Further, because a C-stabilizing element such as Ti or Nb is not intentionally added to the steel of the present invention, if the Cr content is 25.0% or more, it will lead to a drop in the mass production characteristics due to deterioration in hot rolling performance and normal temperature toughness.

In addition, because the core material is exposed to the environment inside the solid polymer fuel cell in a state in which the core material is covered by the carbon layer and the adhesive layer, the corrosion resistance may be of a lesser degree in comparison to application under a condition in which the core material is directly exposed.

Therefore, the Cr content is made more than 13.0% and less than 25.0%. The Cr content is preferably 16.0% or more, and more preferably is 18.0% or more. Further, the Cr content is preferably 24.0% or less, and more preferably is 23.0% or less.

Mo: 0 to 2.5%

Mo has an effect of improving corrosion resistance even when it is added in a small amount in comparison to Cr, and hence Mo may be contained as necessary. Further, even if Mo is eluted, the impact on the performance of a catalyst that is carried in an anode and a cathode portion is comparatively minor. It is considered that this is because the eluted Mo is present as molybdate ions that are anions, and consequently an effect thereof that inhibits the proton conductivity of a fluorine ion exchange resin film having hydrogen ion (proton) exchange groups is small. However, even if Mo is contained in an amount of more than 2.5%, the aforementioned effect is saturated. Therefore, the Mo content is made 2.5% or less. Mo is an expensive additional element. To obtain the aforementioned effect, the Mo content is preferably 0.2% or more, and more preferably is 0.4% or more.

Ni: 0 to 0.8%

Ni has an effect that improves the corrosion resistance and toughness, and therefore may be contained as necessary. However, even if Ni is contained in an amount of more than 0.8%, the aforementioned effect is saturated. Therefore, the Ni content is made 0.8% or less. The Ni content is preferably 0.4% or less, and more preferably is 0.3% or less. To obtain the aforementioned effect, the Ni content is preferably 0.05% or more.

Cu: 0 to 0.8%

Cu has an effect that improves the corrosion resistance, and therefore may be contained as necessary. However, even if Cu is contained in an amount of more than 0.8%, the aforementioned effect is saturated. Therefore, the Cu content is made 0.8% or less. The Cu content is preferably 0.7% or less, and more preferably is 0.65% or less. To obtain the aforementioned effect, the Cu content is preferably 0.01% or more.

Note that, in the steel used in the present invention, Cu is present in a solid solution state. Depending on the heat treatment conditions the Cu can also be caused to precipitate as a Cu-based precipitate. However, if Cu is caused to precipitate, it becomes a starting point for Cu elution inside the cell and lowers the fuel cell performance, and thus has an adverse effect. Cu is preferably present in a solid solution state.

REM: 0 to 0.1%

REM has an effect that improves hot producibility, and therefore may be contained as necessary. However, if an excessive amount of REM is contained, it leads to an increase in the production cost. Hence, the REM content is made 0.1% or less. The REM content is preferably 0.02% or less, and more preferably is 0.01% or less. To obtain the aforementioned effect, the REM content is preferably 0.002% or more, and more preferably is 0.005% or more.

In the present invention, the term "REM" refers to a total of 17 elements that are Sc, Y and the lanthanoids, and the aforementioned content of REM means the total content of these elements. Note that, in industrial use the lanthanoids are added in the form of misch metal.

B: 0 to 1.0%

B precipitates and disperses as $M_2B$ to thereby improve the electrical conductivity of the core material surface, and also serves as precipitation nuclei for controlling precipitation of $M_{23}C_6$, and therefore may be contained as necessary. However, if the B content is more than 1.0%, the precipitated amount of $M_2B$ will be too large, and the mass production characteristics will deteriorate. Therefore, the B content is made 1.0% or less. The B content is preferably 0.8% or less. To obtain the aforementioned effect, a B content is preferably made more than 0.0003%. Further, in the case of actively utilizing the precipitation and dispersal of $M_2B$, a B content of 0.3% or more is preferable.

Sn: 0 to 2.5%

By containing Sn in the steel, Sn that is dissolved in the matrix exerts an effect that reduces the surface contact resistance of the matrix by concentrating as metallic tin or tin oxide on the surface inside the fuel cell. Further, Sn has an effect that noticeably suppresses elution of metal ions from the matrix and improves the corrosion resistance. Hence, Sn may be contained as necessary However, if the Sn content is more than 2.5%, the producibility decreases markedly. Therefore, the Sn content is made 2.5% or less. The Sn content is preferably 1.2% or less, and more preferably is 1.0% or less. To obtain the aforementioned effect, the Sn content is preferably 0.06% or more, and more preferably is 0.25% or more.

In: 0 to 0.1%

In is one of the rare metals, and is an extremely expensive element. However, along with Sn, In has an effect that reduces the surface contact resistance, and therefore may be contained as necessary. However, if In is contained in an amount that is more than 0.1%, the producibility of the steel material is noticeably impaired. Therefore, the In content is made 0.1% or less. The In content is preferably 0.05% or less. To obtain the aforementioned effect, the In content is preferably 0.001% or more, and more preferably is 0.002% or more.

In the chemical composition of the steel of the present invention, the balance is Fe and impurities.

In this case, the term "impurities" refers to components which, during industrial production of the steel, are mixed in from raw material such as ore or scrap or due to various factors in the production process, and which are allowed within a range that does not adversely affect the present invention.

2. Precipitates in the Steel

The steel that is used in the present invention has precipitates that include $M_{23}C_6$ type Cr carbides (hereunder, also referred to simply as "$M_{23}C_6$") that are finely precipitated and dispersed in the steel. The precipitates may also include $M_2B$ type borides (hereunder, also referred to simply as "$M_2B$") or composite precipitates which are composed of $M_2B$ type borides as precipitation nuclei and $M_{23}C_6$ type Cr carbides that are precipitated on the surface of the $M_2B$ type borides as precipitation nuclei. Note that, the character "M" in the $M_{23}C_6$ type Cr carbides represents Cr, or Cr and Fe or the like, and a part of C may be substituted with B. Further, the character "M" in the $M_2B$ type borides represents Cr, or Cr and Fe or the like, and a part of B may be substituted with C. Hereunder, the $M_{23}C_6$ type Cr carbides are also referred to simply as "$M_{23}C_6$". The $M_2B$ type borides are also referred to simply as "$M_2B$".

Some of the precipitates protrude from the steel surface. The $M_{23}C_6$ that protrudes from the steel surface, and furthermore, the $M_2B$ that is precipitated and dispersed as necessary and protrudes from the steel surface exert a function as an electrical conductivity path and have an effect that reduces the contact resistance.

A passivation film (oxide film) is also formed on the surface of the $M_{23}C_6$ and $M_2B$. However, the Cr concentration in the $M_{23}C_6$ and in the $M_2B$ is higher than the Cr concentration in the matrix. In addition, the thickness of a passivation film that is formed on the surface of the $M_{23}C_6$ or the $M_2B$ is thinner than a passivation film that covers the matrix surface. Therefore, these precipitates are excellent in electrical conductivity, and function as an electrical conductivity path.

In a case where B is contained in the steel, B precipitates as $M_2B$ by a eutectic reaction at the time point at which solidification is completed. Crushing can be performed during hot forging, hot rolling or cold rolling to evenly disperse the precipitates. The dispersion state can be controlled by means of the rolling conditions. $M_2B$ are metal precipitates that have electrical conductivity, and are an extremely large size even if crushed. Therefore, it is possible to further reduce the contact resistance by dispersing borides on the surface of the steel that is used in the present invention by performing a pickling treatment.

Further, $M_{23}C_6$ begins to dissolve if the temperature is more than 800 to 900° C. On the other hand, $M_2B$ is extremely stable in regard to thermal properties, and regardless of the production history thereafter, $M_2B$ does not dissolve, disappear or reprecipitate. Therefore, it is effective to cause $M_{23}C_6$ to reprecipitate after dissolving by using $M_2B$ that was crushed and dispersed after precipitation, as a precipitation nucleus. When $M_{23}C_6$ is caused to reprecipitate on the surface of $M_2B$, because the contact area as an electrical conductivity path increases, the contact resistance characteristics can be improved.

To avoid a reduction in corrosion resistance due to intergranular corrosion, it is desirable that precipitation of $M_{23}C_6$ be caused to occur within the grains. It is also possible that a part of $M_{23}C_6$ may unavoidably precipitate at the crystal grain boundary. A Cr depleted zone that accompanies precipitation of $M_{23}C_6$ to the crystal grain boundary can be restored by adopting appropriate heat treatment conditions after precipitation. The presence of a Cr depleted zone that accompanies precipitation of $M_{23}C_6$ type Cr carbides can be easily ascertained by means of an intergranular corrosion testing method such as a "copper sulfate-sulfuric acid test" prescribed in JIS G 0575.

Note that, no particular definition is set with respect to the protruding height from the steel surface of the precipitates protruding from the steel surface as well as the dispersion state of the precipitates. However, for the steel surface, the larger the value of an arithmetic average roughness Ra that is defined by JIS B 0601 is, the higher the frequency with which the precipitates protrude becomes and the greater the opportunities for contact which functions as an electrical conductivity path becomes, and hence a larger arithmetic average roughness Ra value is preferable.

Further, by increasing the surface roughness of the steel, it is possible to achieve a favorable state with respect to the adhesiveness between the adhesive layer and the core material that uses the steel as well as the electrical conductivity at the interface between the adhesive layer and the core material. Therefore, the Ra value of the steel surface is preferably 0.25 to 3.0 μm. The Ra value is more preferably 0.6 μm or more, and is further preferably 0.85 or more. The Ra value is more preferably 2.5 μm or less.

3. Method for Producing Steel

The conditions for producing the steel that is used as the core material are not particularly limited. For example, steel having the aforementioned chemical composition can be produced by performing a hot rolling process, an annealing process, a cold rolling process, and a final annealing process in that order.

Note that, in the hot rolling process, it is preferable to carry out grain size adjustment utilizing the phase transformation of a phase and γ phase at a high temperature, and to also carry out precipitation control of $M_{23}C_6$. Specifically, by controlling so that a duplex micro-structure of α-γ is formed in the course of rolling, it is possible to control the grain size and the intragranular precipitates.

It is desirable to subsequently perform a treatment that roughens the steel surface, so that precipitates protrude from the surface. Although the method for performing a surface roughening treatment is not particularly limited, a pickling (etching) treatment is the most excellent with respect to mass production characteristics. In particular, an etching treatment in which a ferric chloride aqueous solution is sprayed is preferable. A spray-etching treatment that uses a high-concentration ferric chloride aqueous solution is widely used as an etching treatment for stainless steel, and it is also possible to reuse the treatment liquid after use. Although in general a spray-etching treatment that uses a high-concentration ferric chloride aqueous solution is mostly performed as a localized thickness reduction process or a punched hole forming process after performing a masking process, in the present invention surface etching process is used for surface roughening.

The spray-etching treatment will now be described in further detail. The ferric chloride solution that is used is an extremely high-concentration acid solution. Determination of the ferric chloride solution concentration is made in Baume degrees that is an indicator which is measured with a Baume hydrometer. Although the etching treatment for surface roughening may be performed by immersing into a ferric chloride solution in a stationary state or in a flowing state, it is desirable to perform surface roughening by spray-etching. This is because when putting into an industrial scale manufacturing, it is possible to efficiently and accurately control the etching depth, etching speed and degree of surface roughening. The spray-etching treatment can be controlled by means of the pressure discharged from a nozzle, the liquid volume, the liquid flow rate (linear flow rate) at the surface of the etching raw material, the striking angle of spray, and the liquid temperature.

Although it is desirable that the ferric chloride solution that is applied has low copper ion concentration and low Ni concentration, an industrial product that is generally distributed domestically may be purchased and used with no trouble. The ferric chloride solution to be used is a solution having a concentration of 40 to 51° in Baume degrees. If the concentration is less than 40°, the tendency for perforation corrosion strengthens, and it is unsuitable for surface roughening. On the other hand, if the concentration is more than 51°, the etching speed becomes noticeably slow and the deterioration rate of the liquid also quickens. This is unsuitable for use as a roughening treatment liquid for the surface of a core material of a solid polymer fuel cell separator to be put into mass production.

The ferric chloride solution concentration is more preferably made 42 to 46° in Baume degrees. The temperature of the ferric chloride solution is preferably made 20 to 60° C. If the temperature decreases, the etching speed decreases, while if the temperature rises, the etching speed becomes faster. If the temperature is high, liquid deterioration also progresses in a short time.

It is possible to quantitatively evaluate the degree of liquid deterioration continuously by measuring the spontaneous potential of a platinum plate that is immersed in the ferric chloride solution. As a simple method for restoring the liquid capacity in a case where the liquid deteriorated, fresh liquid can be added by pouring or all of the liquid can be replaced with fresh liquid. Further, chlorine gas may be blown into the liquid.

After the etching treatment by means of the ferric chloride solution, the surface is vigorously cleaned immediately with a large amount of clean water. This is done to wash off surface deposits (precipitates) originating from the ferric chloride solution that was diluted with cleaning water. Spray cleaning in which the flow rate on the raw material surface is raised is desirable, and it is also desirable to combine the use of washing in which the raw material is also immersed for a while in flowing water after spray cleaning.

During cleaning and in the subsequent drying process, various kinds of metallic chlorides and hydroxides that are adhered to the surface change in atmospheric air to more stable metals or oxides of the metals. Sn and/or In concentrate as metallic Sn or metallic In or as oxides of metallic Sn or metallic In on the steel surface and on the surface of precipitates that protrude from the steel surface. Each of these substances has electrical conductivity and acts to lower the contact electrical resistance by concentrating at and being present on the surface.

Spray cleaning or an immersion treatment using a sulfuric acid aqueous solution may further be performed after the surface roughening treatment by means of the ferric chloride aqueous solution. Because the ferric chloride solution used in the previous process has extremely low pH and flows at a high rate, metal such as Sn and In as well as the oxides of these metals are in a state in which, if anything, it is difficult for the metals to concentrate on the surface. However, concentration of tin oxide or indium oxide at the surface is promoted by performing, for example, spray cleaning or an immersion treatment using a sulfuric acid aqueous solution having a concentration of less than 20% in a state in which the liquid flow rate is slower than the liquid flow rate (linear flow rate) on the surface of the etching raw material when spray cleaning using the ferric chloride solution is conducted or in a state that is close to a stationary state.

The concentration of the sulfuric acid aqueous solution that is applied differs depending on the corrosion resistance of the raw material to be subjected to the treatment. The concentration is adjusted to a corrosiveness of a degree at which generation of bubbles begins to be observed on the surface when the raw material is immersed. Concentration conditions under which bubbles arise in a vigorous manner accompanying corrosion are not desirable. This is because there is a concern that such a situation will hinder concentration of the aforementioned metals or their oxides at the surface, and will thereby reduce the action that lowers the contact resistance immediately after application of the solid polymer fuel cell.

4. Carbon Separator

The structure of a carbon separator that contains the aforementioned steel therein as a core material is not particularly limited. Usually, the core material is inserted into the carbon separator as the core of a carbon layer, and is used in a state in which the core material is covered by the carbon layer. The main role of the core material as the core is to act as structural material that enhances the strength as a carbon separator, and act as an isolating wall that prevents cross leakage (permeation) of fuel gas. The carbon layer is composed of electroconductive carbonaceous powder and a resin binder, and is fixed to the core material through the adhesive layer.

Although the substance to be used as the electroconductive carbonaceous powder is not particularly limited as long as the substance can be used for the purpose of imparting electrical conductivity, as examples thereof, powders of natural graphite such as flake graphite and lumpy graphite, artificial graphite, expanded graphite, acetylene black, carbon black, Ketjen black, and amorphous carbon may be mentioned.

The substance to be used as the resin binder is not particularly limited as long as the substance can be used for the purpose of improving electrical conductivity and also strengthening the binding between the carbon layer and the core material. As examples thereof, one kind or a mixture of two or more kinds selected from the group consisting of thermosetting resin, thermoplastic resin and rubber can be mentioned, and these may be a liquid or an emulsion. As necessary, addition agents such as a dispersing agent, a thickening agent, a stabilizing agent and an anti-foaming agent may be added.

As the thermosetting resin, there can be mentioned, for example, one kind or a mixture of two or more kinds selected from the group consisting of phenol resin, polycarbodiimide resin, furfuryl alcohol resin, epoxy resin, cellulose, urea resin, melamine resin, unsaturated polyester resin, silicone resin, diallyl phthalate resin, bismaleimide-triazine resin, polyaminobismaleimide resin and aromatic polyimide resin.

As the thermoplastic resin, there can be mentioned, for example, one kind or a mixture of two or more kinds selected from the group consisting of polyethylene, polystyrene, polypropylene, polymethyl methacrylate, polyethylene terephthalate, polybutylene terephthalate, polyethersulfone, polycarbonate, polyoxymethylene, polyamide, polyimide, polyamide-imide, polyvinyl alcohol, polyvinyl chloride, polyphenylsulfone, polyetherether ketone, polysulfone, polyether ketone, polyarylate, polyetherimide, polymethylpentene, fluorine-based resin, polyoxybenzoyl ester resin, liquid crystal polyester resin, aromatic polyester, polyacetal, polyallylsulfone, polybenzimidazole, polyethernitrile, polythioethersulfone and polyphenylene ether.

Furthermore, as the rubber, there can be mentioned, for example, one kind or a mixture of two or more kinds selected from the group consisting of fluorocarbon rubber, silicone rubber, butyl rubber, chloroprene rubber, nitrile rubber, nitrile-chloroprene rubber, chlorinated butyl rubber, epichlorohydrin rubber, epichlorohydrin-ethylene oxide rubber, epichlorohydrin-ethylene oxide-acrylic glycidyl ether terpolymer, urethane rubber, acrylic rubber, ethylene-propylene rubber, styrene rubber, butadiene rubber, and natural rubber.

As the weight ratio between the carbon powder and the resin in the carbon layer, there can be mentioned, for example, a range of 2 to 20 parts by weight of the resin with respect to 100 parts by weight of the carbon powder. Note that if the proportion of the resin is less than 2 parts by weight, it is difficult for the carbon layer to maintain sufficient mechanical strength. Further, if the proportion of the resin is more than 20 parts by weight, there is a problem of an increase in specific resistance.

The adhesive layer may have the same composition as that of the carbon layer, or may include a larger proportion of resin than that of the carbon layer.

Usually, channels as passages for fuel gas and oxidizing gas are formed in the carbon layer.

Figure 4:
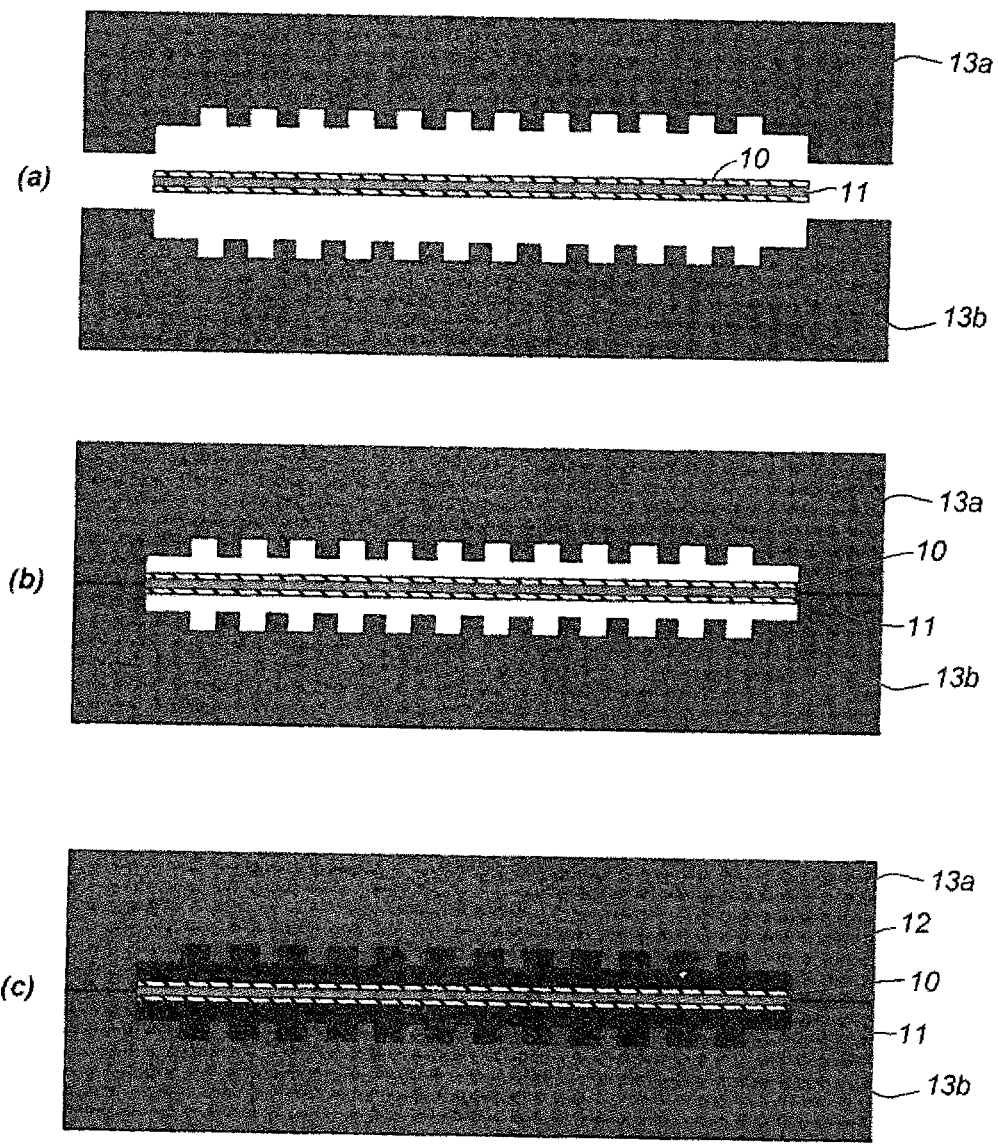
FIG. 4 is an explanatory drawing illustrating a method for producing a carbon separator for a solid polymer fuel cell according to the present invention.
Figure 5:
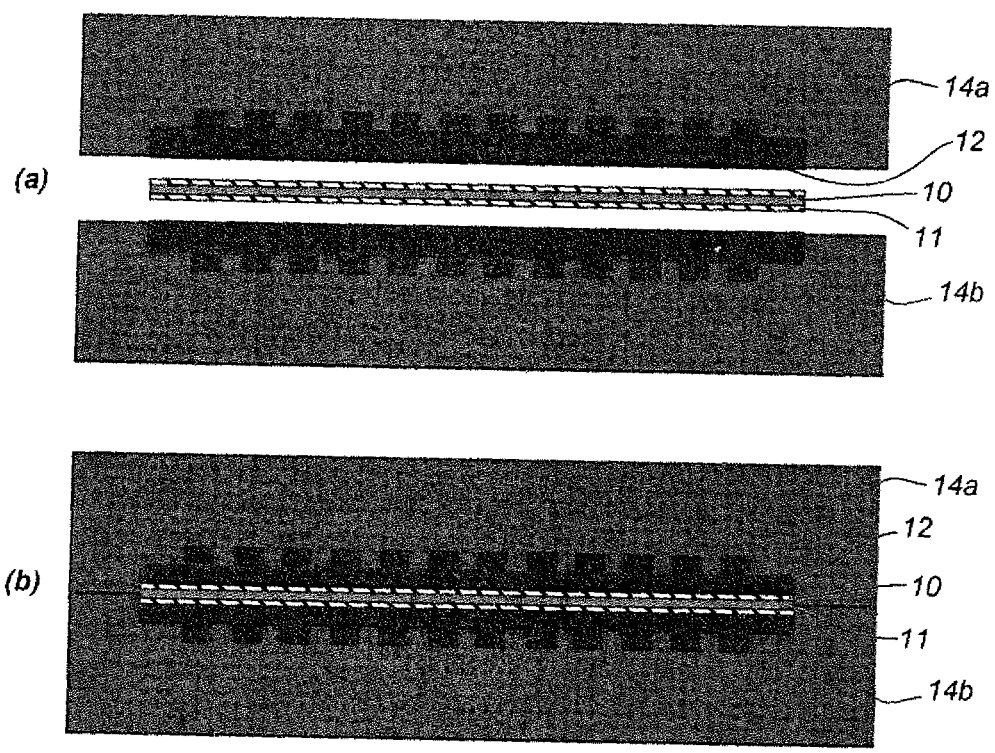
FIG. 5 is an explanatory drawing illustrating a method for producing a carbon separator for a solid polymer fuel cell according to the present invention.

With respect to a method for producing the carbon-based separator, although the method is not particularly limited, the available methods include the following: a method in which a carbon layer in which channels for a cathode side, an anode side, or a cooling water side are formed on only one side and whose shape is fixed is bonded to both sides of the core material (FIG. 2 and FIG. 3); a method in which, in a state in which the core material is supported inside a die for injection molding, carbon layers that are in a state before solidification in which the carbon layers have flowability are pushed into the die, taken out from the die, and thereafter dried and, as necessary, fired (FIG. 4); and a method in which carbon layers before solidification are inserted in advance into each of two upper and lower split-cavity molds to produce the carbon-based separator (FIG. 5).

The respective methods will now be described in further detail. Note that a carbon-containing conductive adhesive may be applied in advance onto the core material surface or the carbon layer that is formed and whose shape is fixed. This has the effect of enhancing the adhesiveness between the core material and the carbon layer. Although the method for applying the adhesive is not particularly limited, dip coating, spraying, brush coating, screen printing or the like are suitable. However, depending on the performance of the carbon layer, or depending on the roughness adjustment of the core material surface, usage of the adhesive may be omitted as long as the adhesiveness and electrical conductivity between the carbon layer and the core material satisfy desired specifications without having an adhesive layer interposed therebetween.

Further, as necessary, the core material may be subjected to punching processing, shearing processing and stretch-forming processing. Punched holes serve as a manifold through which fuel gas, oxidizing gas and cooling water flow when the core material is constructed as part of a fuel cell, and serve as bolt holes for tightening. The shearing may be, specifically, corrugation processing. There is an effect of enhancing a mechanical adherence effect between the carbon layer and the core material by including a concavoconvex shape that is formed by stretch-forming processing.

Figure 2:
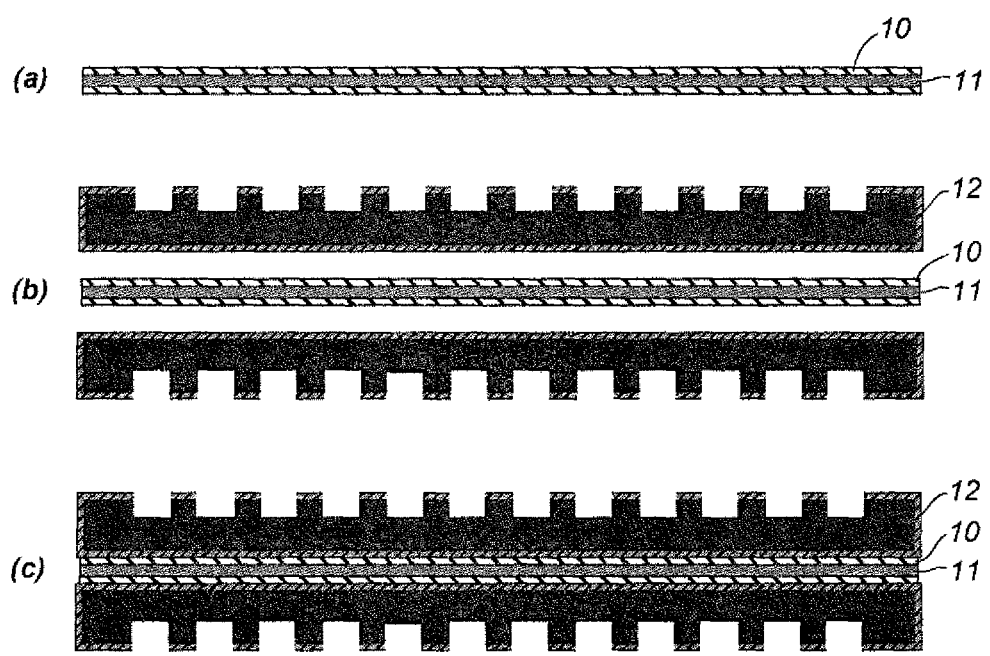
FIG. 2 is an explanatory drawing illustrating a method for producing a carbon separator for a solid polymer fuel cell according to the present invention.

(1) Regarding the Method Shown in FIG. 2

This method is one in which a carbon-containing conductive adhesive 10 is applied onto the surfaces of a core material 11 (see FIG. 2(a)), and thereafter carbon layers 12 which have been formed and whose shapes are fixed are bonded thereon (see FIGS. 2(b) and (c)). The adhesive 10 may also be applied to end face portions of the core material 11. Further, the carbon layer 12 may be designed to be broader than the core material 11, and the end face portions of the core material 11 may be designed so as to be completely inserted within the carbon layers 12 when the carbon layers 12 are bonded to the core material 11.

The adhesive bonding can be performed by pressure bonding in a state in which the adhesive is heated to and maintained at a temperature that is not less than the softening temperature of the adhesive. After the pressure bonding, drying and, as necessary, firing can be performed. The firing may take the form of baking and hardening during conveyance using a tunnel-type kiln, or may be of a form in which a plurality of pieces are baked and hardened using a batch-type kiln.

Figure 3:
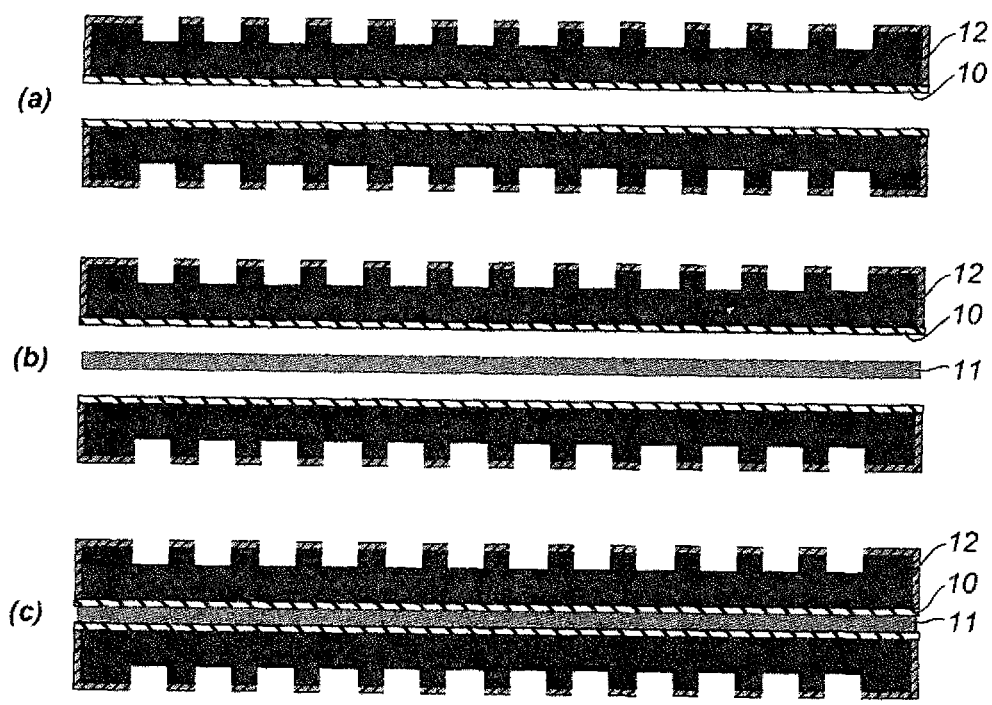
FIG. 3 is an explanatory drawing illustrating a method for producing a carbon separator for a solid polymer fuel cell according to the present invention.

(2) Regarding the Method Shown in FIG. 3

This method is one in which the adhesive 10 is applied onto the faces which are to be bonded of the carbon layers 12 which have been formed and whose shapes are fixed (see FIG. 3(a)), and thereafter the core material 11 is bonded thereto (see FIGS. 3(b) and (c)). The adhesive 10 may also be applied to a surface of the carbon layer 12 that is not a bonding surface.

Further, the carbon layer 12 may be designed to be broader than the core material 11, and the end face portions of the core material 11 may be designed so as to be completely inserted within the carbon layers 12 when the carbon layers 12 are bonded to the core material 11.

The adhesive bonding can be performed by pressure bonding in a state in which the adhesive is heated to and maintained at a temperature that is not less than the softening temperature of the adhesive. After the pressure bonding, drying and, as necessary, firing can be performed. The firing may take the form of baking and hardening during conveyance using a tunnel-type kiln, or may be of a form in which a plurality of pieces are baked and hardened using a batch-type kiln.

(3) Regarding the Method Shown in FIG. 4

This method performs integral molding in which the carbon-containing conductive adhesive 10 is applied onto the surfaces of the core material 11 (see FIG. 4(a)), and in a state in which the core material 11 is supported at a desired position inside dies for injection molding 13a and 13b (see FIG. 4(b)), the carbon layers 12 that have flowability are introduced into the dies 13a and 13b (see FIG. 4(c)). After mold release, drying and, as necessary, firing can be performed. The firing may take the form of baking and hardening during conveyance using a tunnel-type kiln, or may be of a form in which a plurality of pieces are baked and hardened using a batch-type kiln. This method is the most excellent with respect to mass production characteristics, and reduced costs can be anticipated at the time of mass production.

(4) Regarding the Method Shown in FIG. 5

This method is one in which non-solidified carbon layers 12 which are capable of shape retention are molded inside forming dies 14a and 14b (see FIG. 5(a)), and thereafter subjected to pressure bonding onto the surface of the core material 11 on which the carbon-containing conductive adhesive 10 has been applied (see FIG. 5(b)). After mold release, drying and, as necessary, firing can be performed. The firing may take the form of baking and hardening during conveyance using a tunnel-type kiln, or may be of a form in which a plurality of pieces are baked and hardened using a batch-type kiln.

Hereunder, the present invention is described specifically by way of examples, although the present invention is not limited to the following examples.

Example 1

Steel numbers 1 to 32 having the chemical compositions shown in Table 1 were melted in a 75-kg vacuum furnace, and cast into round ingots having a maximum outer diameter of 220 mm at the top portion of the ingot.

TABLE 1

| Steel No. | Chemical composition (by mass %, balance: Fe and impurities) | | | | | | | | | | | | | | | |
|---|---|---|---|---|---|---|---|---|---|---|---|---|---|---|---|---|
| | C | Si | Al | Mn | P | S | N | V | Cr | Mo | Ni | Cu | REM | B | Sn | In |
| 1 | 0.089 | 1.25 | 0.01 | 0.54 | 0.028 | 0.0011 | 0.032 | 0.1 | 19.1 | — | — | — | — | — | — | — |
| 2 | 0.089 | 0.35 | 0.03 | 0.89 | 0.024 | 0.0012 | 0.028 | 0.013 | 19.1 | 0.52 | — | — | — | — | — | — |
| 3 | 0.093 | 0.36 | 0.02 | 0.87 | 0.024 | 0.0010 | 0.026 | 0.009 | 19.0 | 0.53 | — | — | — | — | — | 0.001 |
| 4 | 0.091 | 0.35 | 0.03 | 0.86 | 0.025 | 0.0011 | 0.027 | 0.008 | 19.3 | 0.52 | — | — | — | — | — | 0.002 |
| 5 | 0.090 | 0.36 | 0.02 | 0.87 | 0.026 | 0.0013 | 0.026 | 0.006 | 19.2 | 0.54 | — | — | — | — | 0.001 | — |
| 6 | 0.092 | 0.35 | 0.03 | 0.88 | 0.026 | 0.0008 | 0.028 | 0.007 | 19.3 | 0.53 | — | — | — | — | 0.013 | — |
| 7 | 0.054 | 0.11 | 0.03 | 0.33 | 0.025 | 0.0008 | 0.026 | 0.01 | 12.5 * | — | 0.07 | 0.06 | — | — | — | 0.002 |
| 8 | 0.053 | 0.11 | 0.03 | 0.34 | 0.026 | 0.0006 | 0.027 | 0.01 | 14.6 | — | 0.07 | 0.07 | — | — | 0.04 | 0.001 |
| 9 | 0.056 | 0.10 | 0.04 | 0.36 | 0.028 | 0.0008 | 0.025 | 0.01 | 16.6 | — | 0.08 | 0.06 | — | — | — | 0.002 |
| 10 | 0.057 | 0.11 | 0.03 | 0.34 | 0.025 | 0.0006 | 0.027 | 0.01 | 18.6 | — | 0.10 | 0.07 | — | — | 0.03 | 0.001 |
| 11 | 0.055 | 0.11 | 0.03 | 0.35 | 0.026 | 0.0010 | 0.028 | 0.01 | 20.5 | — | 0.08 | 0.08 | — | — | — | 0.001 |
| 12 | 0.057 | 0.10 | 0.04 | 0.35 | 0.028 | 0.0009 | 0.027 | 0.01 | 22.6 * | — | 0.09 | 0.07 | — | — | — | 0.002 |
| 13 | 0.063 | 0.12 | 0.03 | 0.32 | 0.028 | 0.0010 | 0.032 | 0.01 | 12.3 * | — | 0.06 | 0.12 | — | — | — | — |
| 14 | 0.062 | 0.12 | 0.04 | 0.35 | 0.027 | 0.0011 | 0.036 | 0.01 | 13.6 | — | 0.08 | 0.13 | — | — | — | — |
| 15 | 0.063 | 0.12 | 0.03 | 0.33 | 0.026 | 0.0007 | 0.034 | 0.01 | 14.5 | — | 0.08 | 0.14 | — | — | 0.03 | — |
| 16 | 0.067 | 0.11 | 0.03 | 0.34 | 0.027 | 0.0009 | 0.035 | 0.01 | 16.5 | — | 0.07 | 0.14 | — | — | — | — |
| 17 | 0.064 | 0.11 | 0.04 | 0.35 | 0.027 | 0.0011 | 0.036 | 0.01 | 17.6 | — | 0.08 | 0.15 | — | — | 0.04 | — |
| 18 | 0.064 | 0.11 | 0.05 | 0.33 | 0.027 | 0.0009 | 0.036 | 0.01 | 18.6 | — | 0.08 | 0.16 | — | — | — | — |
| 19 | 0.061 | 0.11 | 0.03 | 0.36 | 0.026 | 0.0008 | 0.035 | 0.01 | 19.4 | — | 0.07 | 0.14 | — | — | 0.04 | — |
| 20 | 0.064 | 0.12 | 0.03 | 0.35 | 0.028 | 0.0009 | 0.037 | 0.01 | 20.6 | — | 0.08 | 0.16 | — | — | — | — |
| 21 | 0.068 | 0.12 | 0.04 | 0.35 | 0.027 | 0.0010 | 0.036 | 0.01 | 21.8 | — | 0.07 | 0.16 | — | — | 0.06 | — |
| 22 | 0.066 | 0.11 | 0.04 | 0.36 | 0.027 | 0.0010 | 0.036 | 0.01 | 22.8 | — | 0.06 | 0.17 | — | — | — | — |
| 23 | 0.063 | 0.10 | 0.03 | 0.36 | 0.026 | 0.0008 | 0.037 | 0.01 | 25.7 * | — | 0.08 | 0.16 | — | — | — | — |
| 24 | 0.073 | 0.26 | 0.04 | 0.34 | 0.026 | 0.0009 | 0.046 | 0.12 | 17.2 | 0.82 | 0.25 | 0.18 | 0.005 | — | — | 0.001 |
| 25 | 0.077 | 0.25 | 0.03 | 0.33 | 0.027 | 0.0010 | 0.044 | 0.11 | 17.3 | 1.52 | 0.22 | 0.17 | 0.006 | — | 0.04 | 0.001 |
| 26 | 0.075 | 0.26 | 0.03 | 0.35 | 0.028 | 0.0021 | 0.045 | 0.12 | 17.2 | 2.12 | 0.27 | 0.18 | 0.005 | — | — | 0.001 |
| 27 | 0.091 | 0.35 | 0.01 | 0.65 | 0.035 | 0.0022 | 0.036 | 0.11 | 19.2 | — | 0.08 | 0.02 | — | — | — | — |
| 28 | 0.093 | 0.36 | 0.02 | 0.66 | 0.036 | 0.0026 | 0.036 | 0.11 | 19.3 | — | 0.08 | 0.01 | — | — | 0.04 | — |
| 29 | 0.092 | 0.35 | 0.02 | 0.68 | 0.035 | 0.0028 | 0.035 | 0.13 | 19.2 | — | 0.07 | 0.03 | — | — | 0.06 | — |
| 30 | 0.125 * | 0.35 | 0.09 | 0.66 | 0.048 | 0.0082 | 0.033 | 0.12 | 19.1 | — | 0.09 | 0.02 | — | — | — | — |
| 31 | 0.086 | 1.23 | 0.03 | 0.55 | 0.035 | 0.0012 | 0.035 | 0.09 | 19.2 | — | 0.68 | 0.03 | — | — | 0.31 | — |
| 32 | 0.085 | 1.55 * | 0.04 | 0.53 | 0.037 | 0.0015 | 0.036 | 0.11 | 19.3 | — | 0.67 | 0.08 | — | — | 0.32 | — |

* indicates that conditions do not satisfy those defined by the present invention.

The cast surface of the respective ingots was removed by machining, and the ingots were heated inside a city gas-burning furnace that was heated to 1220° C. and were soaked and held for two hours at that temperature, and thereafter, with the surface temperature of the ingot being in a temperature range from 1180° C. to 870° C., the respective ingots were forged into a slab for hot rolling having a thickness of 35 mm and a width of 160 mm, and were then allowed to cool. The respective slabs were sawn into billets having a thickness of 35 mm, a width of 160 mm and a length of 200 mm and adopted as billets for hot rolling.

The respective billets for hot rolling were heated inside an electric furnace that was set to 1220° C., and subjected to hot rolling and cooling during seven passes. The total rolling reduction in a temperature region that was more than 1050° C. was made constant at 55%. Further, for all of the steel materials, the final pass started at a time point at which the surface temperature of the billet became 900° C.

Immediately after hot rolling of the billet ended, the billet was cooled by a method that simulated a pattern for allowing cooling of a hot-rolled coil. Specifically, immediately after hot rolling, the hot-rolled steel material was inserted into a commercially available heat insulating material "Isowool" (trade name of a high-temperature heat insulating material manufactured by Isolite Insulating Products Co. Ltd.) and allowed to cool gradually over 16 hours. The Isowool was thereafter removed and the hot-rolled steel material is air-cooled. The thickness of the Isowool that was used was 30 mm.

Even after the steel material was allowed to cool for 16 hours, the surface temperature of the steel material before removing the Isowool was a temperature of more than 500° C., and roughly resembled the temperature history in the case of allowing cooling of an 8-ton hot rolled coil in mass production. Cracking during hot rolling did not occur for any of the stock, and the external appearance of the hot-rolled steel materials was good. The hot rolling finishing plate thickness was made constant at 3 mm.

In addition, after hot rolling, on the assumption of undergoing box annealing, the steel materials were subjected to a heat treatment in which the steel materials were held for six hours at 820° C. Thereafter the respective steel materials were inserted into Isowool and cooled gradually until the surface temperature of the steel material became 300° C. or less, and thereafter forced air-cooling was performed.

Microstructures were observed for the samples of steel numbers 1 to 32, and precipitation of Cr carbides in all of the steel materials was confirmed as a result.

After completely removing oxide scale on the surface by machining, an intergranular corrosion test was carried out in accordance with JIS G 0575. However, in order to suppress general corrosion of the base material and evaluate only intergranular corrosion properties, a modified test evaluation was adopted in which the test temperature was lowered to 90° C. As a result, intergranular corrosion was not observed.

Thereafter, oxide scale on the surface was removed by shot blasting, and the steel material was further immersed in a nitric-hydrofluoric acid solution heated to 60° C. that included 8% of nitric acid+6% of hydrofluoric acid to thereby perform a descaling treatment, and the resulting material was adopted as the stock for cold rolling. In the cold rolling, the finished plate thickness was made constant at 0.8 mm, and after rolling was completed, an annealing treatment was performed under conditions in which the steel material was held at 820° C. for 3 minutes.

C., and thereafter was washed with water. Various kinds of performance evaluation tests were performed using the test specimen that had undergone the aforementioned treatment. Note that, although a detailed check was conducted, precipitation of Sn-based intermetallic compounds was not observed in any of the steel materials. It can be concluded that the Sn dissolved in the parent phase. A summary of the evaluation results is shown in Table 2.

TABLE 2

| Test No. | Steel No. | Surface roughness Ra (μm) | Electrical contact resistance value (mΩ·cm$^2$) | After etching treatment Fe + Cr concentration in solution (ppm) | Evaluation result of corrosion resistance | After forming adhesive layer Evaluation result of peeling resistance | After covering carbon layer Fe + Cr concentration in solution (ppm) | Evaluation result of corrosion resistance | |
|---|---|---|---|---|---|---|---|---|---|
| 1 | 1 | 1.87 | 13.6 | 69 | ○ | ○ | 1.6 | ○ | Inventive |
| 2 | 2 | 1.42 | 13.5 | 68 | ○ | ○ | 1.8 | ○ | example |
| 3 | 3 | 1.44 | 13.9 | 59 | ○ | ○ | 1.7 | ○ | |
| 4 | 4 | 1.36 | 13.6 | 54 | ○ | ○ | 1.6 | ○ | |
| 5 | 5 | 1.38 | 13.7 | 55 | ○ | ○ | 1.7 | ○ | |
| 6 | 6 | 1.36 | 13.5 | 49 | ○ | ○ | 1.6 | ○ | |
| 7 | 7 * | 3.89 | 42.3 | 436 | x | x peeling | — (could not be performed) | | Comp. ex. |
| 8 | 8 | 2.87 | 16.3 | 98 | ○ | ○ | 3.5 | ○ | Inventive |
| 9 | 9 | 2.70 | 16.6 | 86 | ○ | ○ | 3.1 | ○ | example |
| 10 | 10 | 1.96 | 16.4 | 67 | ○ | ○ | 1.9 | ○ | |
| 11 | 11 | 1.39 | 16.2 | 59 | ○ | ○ | 1.6 | ○ | |
| 12 | 12 * | 0.99 | 16.8 | 43 | ○ | x rupture | — (could not be performed) | | Comparative |
| 13 | 13 * | 3.93 | 46.9 | 489 | x | x peeling | — (could not be performed) | | example |
| 14 | 14 | 2.78 | 15.7 | 110 | ○ | ○ | 4.0 | ○ | Inventive |
| 15 | 15 | 2.79 | 15.4 | 98 | ○ | ○ | 3.5 | ○ | example |
| 16 | 16 | 2.73 | 15.6 | 89 | ○ | ○ | 3.2 | ○ | |
| 17 | 17 | 2.30 | 15.4 | 73 | ○ | ○ | 2.6 | ○ | |
| 18 | 18 | 2.11 | 15.9 | 74 | ○ | ○ | 2.1 | ○ | |
| 19 | 19 | 1.78 | 15.3 | 61 | ○ | ○ | 1.7 | ○ | |
| 20 | 20 | 1.32 | 14.8 | 58 | ○ | ○ | 1.6 | ○ | |
| 21 | 21 | 0.97 | 14.6 | 42 | ○ | ○ | 1.2 | ○ | |
| 22 | 22 | 0.92 | 14.8 | 42 | ○ | ○ | 1.2 | ○ | |
| 23 | 23 * | 0.13 | 14.3 | 23 | ○ | x rupture | — (could not be performed) | | Comp. ex. |
| 24 | 24 | 1.80 | 14.2 | 66 | ○ | ○ | 1.8 | ○ | Inventive |
| 25 | 25 | 1.08 | 14.1 | 43 | ○ | ○ | 1.2 | ○ | example |
| 26 | 26 | 0.71 | 14.2 | 36 | ○ | ○ | 1.0 | ○ | |
| 27 | 27 | 2.01 | 13.8 | 69 | ○ | ○ | 1.9 | ○ | |
| 28 | 28 | 1.81 | 13.9 | 62 | ○ | ○ | 1.8 | ○ | |
| 29 | 29 | 1.84 | 13.7 | 63 | ○ | ○ | 1.7 | ○ | |
| 30 | 30 * | 2.07 | 13.7 | 70 | ○ | x rupture | — (could not be performed) | | Comp. ex. |
| 31 | 31 | 1.76 | 13.4 | 51 | ○ | ○ | 1.4 | ○ | Inv. ex. |
| 32 | 32 * | 1.79 | 13.2 | 50 | ○ | x rupture | — (could not be performed) | | Comp. ex. |

* indicates that conditions do not satisfy those defined by the present invention.

Thereafter, $M_{23}C_6$ type Cr carbides were observed once again. As a result, precipitation of $M_{23}C_6$ type Cr carbides was confirmed in each of the steel materials, and it was confirmed that the $M_{23}C_6$ type Cr carbides were finely dispersed inside the grains.

Next, oxide scale on the surface was removed by shot blasting, and the steel material was further immersed in a nitric-hydrofluoric acid solution heated to 60° C. that included 8% of nitric acid+6% of hydrofluoric acid to thereby perform a descaling treatment, and the resulting material was adopted as a test specimen for performance evaluation. A plate material having dimensions of 80 mm×120 mm was cut out from the test specimen for performance evaluation by cutting, and thereafter the surface was subjected to automatic polishing with wet 600-grade emery paper, and in addition one side of the plate surface was subjected to scarfing by spraying a ferric chloride aqueous solution of having a density criterion concentration of 43° Baume at a solution temperature of 30°

The surface roughness was evaluated by the Ra evaluation method that is standardized in JIS B 0601.

The electrical contact resistance value of each test specimen was evaluated by a contact resistance measurement method in accordance with the four-terminal method using "Torayca (trade name) TGP-H-90" carbon paper manufactured by Toray Industries Inc. This method is the most common method for measuring the contact resistance of the surface of starting material for a metal separator. The measurement was made by varying the additional load during the measurement in the range of 5 kg/cm$^2$ to 25 kg/cm$^2$, and Table 2 shows the measurement values when the additional load was 15 kg/cm$^2$. A low value for the contact resistance value is desirable. In the present invention, the contact resistance characteristics were determined as excellent in a case where the contact resistance value was 20 mΩ·cm$^2$ or less. Note that, the electrical contact resistance value of a gold-plated surface measured by the same method is 2 mΩ·cm$^2$.

When cases in which the core material was directly exposed from the carbon layer due to structurally unavoidable factors, or in which the core material was directly exposed from carbon layer defect portions that unavoidably remained were assumed, the corrosion resistance as a single test specimen after etching treatment was evaluated by an immersion test at 80° C. in a sulfuric acid aqueous solution of pH3 that simulated the inside of a fuel cell. Specifically, the immersion test was performed in a state in which 600 mL of sulfuric acid aqueous solution had been poured into a test container made of quartz glass with a capacity of 1200 mL, and two test specimens with a size of 30 mm×60 mm were resting against a jig made of PTFE, and analysis of the post-test solution was performed. The immersion test time was 24 hours. Determination of the amount of metal ions in the solution was made with respect to Fe and Cr.

In Table 2, the total (ppm) eluted ion concentration for Fe and Cr is shown. Further, a case where the total amount of eluted Fe and Cr was 300 ppm or more is indicated by the symbol "x", a case where the total amount of eluted Fe and Cr was less than 300 ppm and not less than 150 ppm is indicated by the symbol "Δ", and a case where the total amount of eluted Fe and Cr was less than 150 ppm is indicated by the symbol "O". The lower the amount of metal ions which have a risk of adversely affecting fuel cell performance is, the more preferable it is.

Thereafter, an adhesive layer for improving the adhesiveness between the core material and the carbon layer was formed on the surface of the test specimen after the aforementioned etching treatment. As the adhesive, an substance was prepared in which 32 parts by weight of phenol resin was mixed using a ball mill into 50 parts by weight of flake graphite (mean particle diameter is 3 μm), 50 parts by weight of acetylene black (mean particle diameter is 40 nm) and 0.1 parts by weight of electrically conductive amorphous carbon, which are commercially available. The adhesive was applied by spraying and allowed to dry naturally to thereby prepare stock for evaluation. Thereafter, evaluation of the adhesiveness was made by an 80° C. hot water immersion test using the stock for evaluation. The size of the stock for evaluation was 30 mm×120 mm. The number of test samples was 2. The thickness of the adhesive layer was 30 μm for one side.

The 80° C. hot water immersion test will now be described. The 80° C. hot water immersion test is a peel test for performing an evaluation of the surface state after test specimens are immersed and left for 8 hours in ion exchanged water. Note that, prior to performing the immersion test, a bending evaluation was made in which the test specimen was bent along the surface of a polished billet (bar) of 100 mm φ. Test specimens which, at that time, were too hard or in which a rupture occurred due to insufficient ductility and bending could not be performed are indicated by "x rupture" in Table 2.

In test specimens in which the adhesiveness with respect to the adhesive layer was poor, peeling and dropping off of the layer occurred as a result of only bending. The test specimens in which peeling and dropping off of the carbon layer occurred at the time of bending prior to the immersion test are indicated by "x peeling", test specimens in which peeling occurred during the immersion test are indicated by the symbol "Δ", and test specimens in which the carbon layer remained firmly attached after the immersion test are indicated by the symbol "O". Peeling is influenced by an adhesion effect produced by the concavoconvex shape of the surface and by interfacial peeling caused by corrosion of the core material under the adhesive layer. The main cause of peeling in the immersion test is core material corrosion under the adhesive layer.

A test carbon separator in which a carbon layer was provided on the adhesive layer was prepared and subjected to performance evaluation. As one example of the carbon layer, an electrically conductive resin composed of 70 parts by weight of flake graphite (mean particle diameter is 3 μm), 20 parts by weight of acetylene black (mean particle diameter is 40 nm), 0.5 parts by weight of electrically conductive amorphous carbon and 20 parts by weight of phenol resin, which are commercially available, was used. Using a die, the core material on which the adhesive layer had been formed was disposed so as to be located at the center in the thickness direction, and the carbon layer was covered onto both faces of the core material by an injection molding method. The carbon layer thickness was made an average of 0.3 mm per side.

The performance was evaluated under the same conditions as those for the corrosion resistance evaluation method with respect to the electrically conductive core. That is, the performance was evaluated by an 80° C. immersion test in a sulfuric acid aqueous solution of pH3 that simulated the inside of a fuel cell. However, the test time was set to 96 hours. The end faces of the core material were exposed to make the evaluation.

A summary of the results is shown in Table 2. Test specimens for which the term "-(could not be performed)" is shown in Table 2 are test specimens which were determined as being difficult to apply as core material because the test specimen was too hard at the time of bending or because the adhesiveness of the adhesive layer was poor. Therefore, with respect to these specimens, covering with a carbon layer was not performed. Steel material that is too hard is not suitable as core material because punching or forming that may be performed as necessary is difficult.

With respect to the respective covered stocks, peeling of the carbon layer or adhesive layer was not observed in any of the cases. Determination of the amounts of metal ions in the solution was made by quantitative evaluation with respect to Cr and Fe. In Table 2, based on the sum total of the metal elution ions of Fe and Cr, a case where the amount was 20 ppm or more is indicated by the symbol "x", a case where the amount was less than 20 ppm and not less than 5 ppm is indicated by the symbol "Δ", and a case where the amount was less than 5 ppm is indicated by the symbol "0". The lower the eluted amount of metal ions is, the more preferable it is.

Example 2

Steels Nos. 33 to 40 shown in Table 3 were melted in a 180-kg vacuum furnace, and cast into flat ingots with a maximum thickness of 80 mm. The cast surface of the respective ingots was removed by machining, and after being heated and soaked and held in a city gas-burning furnace that was heated to 1180° C., the respective ingots were forged into a slab for heat rolling having a thickness of 60 mm and a width of 430 mm, with the surface temperature of the ingot being in a temperature range from 1160° C. to 870° C.

TABLE 3

| Steel No. | C | Si | Al | Mn | P | S | N | V | Cr | Mo | Ni | Cu | REM | B | Sn | In | Remarks |
|---|---|---|---|---|---|---|---|---|---|---|---|---|---|---|---|---|---|
| 33 | 0.071 | 0.26 | 0.08 | 0.35 | 0.033 | 0.0022 | 0.041 | 0.09 | 19.2 | 0.31 | 0.15 | 0.09 | — | 0.36 | — | — | |
| 34 | 0.073 | 0.25 | 0.11 | 0.34 | 0.035 | 0.0025 | 0.042 | 0.11 | 19.2 | 0.62 | 0.16 | 0.10 | — | 0.62 | 0.03 | — | |
| 35 | 0.076 | 0.26 | 0.12 | 0.33 | 0.036 | 0.0022 | 0.045 | 0.12 | 19.5 | 0.63 | 0.16 | 0.08 | — | 0.75 | — | — | |
| 36 | 0.093 | 0.34 | 0.08 | 0.87 | 0.025 | 0.0010 | 0.026 | 0.006 | 19.7 | 0.53 | — | — | — | 0.61 | — | — | |
| 37 | 0.091 | 0.34 | 0.09 | 0.89 | 0.024 | 0.0012 | 0.027 | 0.005 | 19.8 | 0.52 | — | — | — | 0.63 | — | 0.001 | |
| 38 | 0.090 | 0.35 | 0.07 | 0.90 | 0.026 | 0.0013 | 0.027 | 0.008 | 19.7 | 0.51 | — | — | — | 0.62 | — | 0.002 | |
| 39 | 0.092 | 0.36 | 0.08 | 0.88 | 0.026 | 0.0009 | 0.028 | 0.008 | 19.9 | 0.53 | — | — | — | 0.62 | 0.001 | — | |
| 40 | 0.089 | 0.35 | 0.09 | 0.92 | 0.025 | 0.0010 | 0.027 | 0.006 | 19.6 | 0.52 | — | — | — | 0.63 | 0.012 | — | |
| 41 | 0.021 * | 0.39 | 0.02 | 0.48 | 0.038 | 0.0022 | 0.017 | 0.07 | 11.8 * | — | 0.22 | 0.06 | — | — | — | — | SUS410L |
| 42 | 0.066 | 0.32 | 0.02 | 0.66 | 0.038 | 0.0018 | 0.036 | 0.07 | 16.7 | — | 0.11 | 0.10 | — | — | — | — | SUS430 |

* indicates that conditions do not satisfy those defined by the present invention.

Surface defects of the slab of a thickness of 60 mm and a width of 430 mm were removed by grinding in a hot processing while the surface temperature was kept at 300° C. or more, and thereafter the slab was inserted into and heated in a heating furnace that used city gas which was heated to 1130° C., and was soaked and held for two hours. Thereafter, the slab was hot-rolled to a thickness of 2.2 mm using a hot rolling mill having two rollers on each of the top and bottom and wound into a coil shape, and allowed to cool to room temperature. When the slab was wound into the coil shape, forced water cooling was performed by water spraying to make the surface temperature of the stock at the time point of winding 400° C. or less.

The hot-rolled coil material was subjected to an annealing treatment in which the coil material was held at 820° C. for 150 seconds in a continuous coil annealing line, and was then cooled by forced air-cooling processing. Thereafter, surface oxide scale was removed by shot blasting, and the coil material was further immersed in a nitric-hydrofluoric acid solution heated to 60° C. that included 8% of nitric acid+ 6% of hydrofluoric acid to thereby perform a descaling treatment, and the resulting material was adopted as the stock for cold rolling.

After the coil width of the cold rolling stock was made 400 mm by slitting, the cold rolling stock was finished into a cold-rolled coil having a thickness of 0.1 mm and a width of 400 mm using a Sendzimir cold rolling mill having 10 rollers on each of the top and bottom.

Final annealing was performed in a bright annealing furnace in a 75 vol % of $H_2$-25 vol % of $N_2$ atmosphere in which the dew point was adjusted in the range of −50 to −53° C. The heating temperature of the soaking zone was 820° C., and the holding time was 120 seconds. With respect to all of Test Nos. 33 to 40, noticeable end face cracking, coil rupturing, coil surface defects or coil perforation were not observed in the course of the present experimental production.

Although the micro-structures were all ferrite single-phase micro-structures, $M_2B$ and $M_{23}C_6$ were precipitated and dispersed within the grains, and some of the $M_{23}C_6$ adopted the $M_2B$ as a precipitation nucleus and had precipitated on the surface thereof. Although a detailed check was conducted, precipitation of Sn-based intermetallic compounds was not observed.

Cleaning was performed after removing a bright annealing surface film by polishing with 600-grade emery paper, and an intergranular corrosion test was performed in accordance with JIS G 0575. However, in order to suppress general corrosion of the base material and evaluate only intergranular corrosion properties, a modified test evaluation was adopted in which the test temperature was lowered to 90° C. As a result, intergranular cracking did not occur.

Cut plates having a thickness of 0.1 mm, a width of 400 mm and a length of 300 mm were extracted, and a spray etching treatment using a 43° Baume ferric chloride solution was performed at 30° C. simultaneously on the entire top and bottom faces of the cut plates. The time period of the etching treatment by spraying was approximately 30 seconds. Adjustment was performed at the line speed, and the etching amount was set at 5 μm for a single face. Test specimens were extracted and the same evaluations as the evaluations performed in Example 1 were performed.

A summary of the evaluation results are shown in Table 4. Note that, Test Nos. 41 and 42 in Table 4 are standard steel grades (steel Nos. 41 and 42 in Table 3), for which cold-rolled stock having a plate thickness of 0.1 mm was purchased commercially and adopted for comparative evaluation use.

[Table 4]

TABLE 4

| | | | | After etching treatment | | After forming adhesive layer | After covering carbon layer | | |
|---|---|---|---|---|---|---|---|---|---|
| Test No. | Steel No. | Surface roughness Ra (μm) | Electrical contact resistance value (mΩ · cm$^2$) | Fe + Cr concentration in solution (ppm) | Evaluation result of corrosion resistance | Evaluation result of peeling resistance | Fe + Cr concentration in solution (ppm) | Evaluation result of corrosion resistance | |
| 33 | 33 | 2.65 | 13.1 | 66 | ◯ | ◯ | 2.3 | ◯ | Inventive example |
| 34 | 34 | 2.45 | 13.2 | 53 | ◯ | ◯ | 1.9 | ◯ | |
| 35 | 35 | 2.68 | 13.1 | 56 | ◯ | ◯ | 2.0 | ◯ | |
| 36 | 36 | 1.24 | 13.3 | 67 | ◯ | ◯ | 1.7 | ◯ | |
| 37 | 37 | 1.22 | 13.7 | 60 | ◯ | ◯ | 1.6 | ◯ | |

TABLE 4-continued

| Test No. | Steel No. | Surface roughness Ra (μm) | Electrical contact resistance value (mΩ·cm²) | After etching treatment Fe + Cr concentration in solution (ppm) | After etching treatment Evaluation result of corrosion resistance | After forming adhesive layer Evaluation result of peeling resistance | After covering carbon layer Fe + Cr concentration in solution (ppm) | After covering carbon layer Evaluation result of corrosion resistance | |
|---|---|---|---|---|---|---|---|---|---|
| 38 | 38 | 1.26 | 13.4 | 53 | ○ | ○ | 1.6 | ○ | |
| 39 | 39 | 1.18 | 13.6 | 51 | ○ | ○ | 1.6 | ○ | |
| 40 | 40 | 1.28 | 13.7 | 51 | ○ | ○ | 1.7 | ○ | |
| 41 | 41 * | 4.09 | 61.9 | 502 | x | Δ | 26.7 | x | Comp. ex. |
| 42 | 42 * | 2.70 | 28.3 | 126 | ○ | Δ | 6.7 | Δ | Ref. ex. |

* indicates that conditions do not satisfy those defined by the present invention.

REFERENCE SIGNS LIST

1 Fuel Cell Stack
2 Solid Polymer Membrane
3 Fuel Electrode Layer (Anode)
4 Oxide Electrode Layer (Cathode)
5a, 5b Separator
6a, 6b Channel
10 Adhesive
11 Core Material
12 Carbon Layer
13a, 13b Die
14a, 14b Forming Die

The invention claimed is:

1. A carbon separator for a solid polymer fuel cell, the carbon separator comprising a core material made of steel and a carbon layer, the steel having a chemical composition consisting of, by mass %:
C: more than 0.02% to not more than 0.12%,
Si: 0.05 to 1.5%,
Al: 0.001 to 1.0%,
Mn: 0.01 to 1.0%,
P: 0.045% or less,
S: 0.01% or less,
N: 0.06% or less,
V: 0.5% or less,
Cr: more than 13.0% to less than 25.0%,
Mo: 0 to 2.5%,
Ni: 0 to 0.8%,
Cu: 0 to 0.8%,
REM: 0 to 0.1%,
B: 0 to 1.0%,
Sn: 0 to 2.5%, and
In: 0.001 to 0.1%, and
the balance: Fe and impurities,
the steel having therein precipitates including M23C6 type Cr carbides that are finely precipitated and dispersed, where M represents Cr, or Cr and Fe,
wherein a part of the precipitates protrude from the steel surface.

2. The carbon separator according to claim 1, wherein the chemical composition contains, by mass %:
B: more than 0.0003% to not more than 1.0%.

3. The carbon separator according to claim 2, wherein:
the precipitates further include M2B type borides, wherein M represents Cr, or Cr and Fe.

4. The carbon separator according to claim 2, wherein:
the precipitates further include composite precipitates in which M23C6 type Cr carbides are precipitated on surfaces of M2B type borides as precipitation nuclei, wherein M represents Cr, or Cr and Fe.

5. A solid polymer fuel cell comprising the carbon separator according to claim 1.

6. A solid polymer fuel cell stack comprising the solid polymer fuel cell according to claim 5.

7. A solid polymer fuel cell comprising the carbon separator according to claim 2.

8. A solid polymer fuel cell comprising the carbon separator according to claim 3.

9. A solid polymer fuel cell comprising the carbon separator according to claim 4.

10. A solid polymer fuel cell stack comprising the solid polymer fuel cell according to claim 7.

11. A solid polymer fuel cell stack comprising the solid polymer fuel cell according to claim 8.

12. A solid polymer fuel cell stack comprising the solid polymer fuel cell according to claim 9.

* * * * *